United States Patent Office 2,995,526
Patented Aug. 8, 1961

2,995,526
COMPOSITION FOR SMOKE PRODUCTION
Jack De Ment, 4847 SE. Division St., Portland 6, Oreg.
No Drawing. Filed July 27, 1951, Ser. No. 240,069
3 Claims. (Cl. 252—305)

This invention relates to compositions and methods for the production of a large new class of smokes. This class of improved smokes includes some 600 varieties, covering about 60 different elements.

Among the objects of the present improvement are the following:

(a) To provide a new class of smokes and smoke-forming munitions of unique composition, as hereinafter described.

(b) To make available a smoke-forming munition of value in the military and naval arts. For example, the new smokes, and the compositions which yield them, are adapted to such applications as screening, signaling, camouflage, and the like.

(c) To provide the art of industrial fumigation with a new and improved class of economic poisons.

(d) To make available an improvement in the chemical warfare art; namely, a munition which produces chemical-warfare type smokes having a broad range of composition and properties.

(e) To make available an improved radiological warfare weapon; that is, a munittion which yields a variety of radioactive smokes, e.g., derived from fission products.

(f) To provide the art of induced precipitation with a munition for producing smoke having cloud nucleating ("seeding") characteristics. Also, to provide the art of fog dispersal with a munition which produces hygroscopic smoke.

Other objects of the present invention will be apparent to those skilled in the chemical arts, from the subsequent disclosure, and are particularly pointed out in the claims.

In general, the present improvement embraces a composition which comprises four basic reactive components. These components, once ignited, undergo an essentially solid state reaction. The consequence of this reaction is the formation and liberation of what I call a "halogenic smoke." The solid state reaction involves a high-temperature recombination of ions (e.g., of anions and cations, of complex anions and cations, and, in particular, evidently of a change of the electronic charges of anions and cations or a component part of either).

Two of the reactive components, which are selected from two classes of ingredients I designate as oxidant and fuel, A and B respectively, react with each other as well as with the other two of the reactive components, which are selected from the other two classes of ingredients I designate as halogen donor and halogen receptor, C and D respectively. The nature of the halogenic smoke is decided by the two classes C and D. The halogenic smoke is formed as a consequence of, and driven from the reacting mass by, the heat generated in the reaction of the components A and B.

Briefly, in a chemical sense, these four basic reactive components appear best considered as the cationic and/or anionic portions or their equivalents of a compound or substance. Compositionally, the present improvement embraces several modifications. Thus, the four basic components are selected from four separate classes of materials, A, B, C and D. Or, a single material is selected and used when that material fulfills the requirements of, or possesses the characteristics of, two of the basic reactive components.

In my experimental development of the present improvement I have successfully used a large number and wide variety of single compounds which have the reaction properties of an admixture of two separate substances from two different classes: For example, single compounds of the types AC (oxidant-halogen donor), AD (oxidant-halogen receptor), BC (fuel-halogen donor), BD (fuel-halogen receptor) and DC (halogen receptor-halogen donor).

My laboratory investigations have covered many different compounds and admixtures. Only a representative list of examples can be given herein, although others are operative and equivalents are well within the choice of those skilled in the art. As to proportions, the same thing is true. The present examples will be clearly sufficiently definite to guide those skilled in the art to a successful application. In utilizing variations and modifications of the present improvement, the matter of proper proportions is a matter of simple experiment and simple quantitative deviation from the examples set forth herein.

The classes of reactive components, A, B, C and D, following, include examples of materials which were found by laboratory test to be useful. When a substance behaves as two of the components, the appropriate class letter is placed behind it in parenthesis: For example, a metallic soap in which the fatty acid addendum is B, the fuel, and the metallic portion is D, the halogen receptor; or, an alkali bromate in which the compound behaves simultaneously as an oxidant, A, and as a halogen donor, C.

(A) *Oxidant.*—The oxidant class contains such compounds as those of the types $R(XO)_n$, $R(XO_2)_n$, $R(XO_3)_n$, $R(XO_4)_n$, where R is an alkali, alkaline earth (D) or heavy metal (D) atom as well as $NH_4$ and H when stable compounds of the latter are known, n is the valence of R, and X is Cl, Br (C), I (C): For example, such peroxy compounds as chlorites, chlorates, perchlorates, bromates, periodates and iodates. Preferred as of most general utility are the chlorates, bromates and iodates. Also useful as oxidants are nitrates, chromates, dichromates, permanganates, peroxides and the like.

(B) *Fuel.*—The fuel class contains such oxidizable materials as sulfur; various sugars (e.g., sucrose, lactose); starch; dextrin; cellulose; various forms of carbon (e.g., charcoal, soot, powdered coal); various hydrocarbons (e.g., petrolatum, anthracene); natural waxes and gums; lanolin; and the like. Also useful as fuel components are such oxidizable anionic groups, organic addenda in particular, and the like, as acetate (C and/or D); lactate; fluoresceinates (D); fatty acid derivatives (e.g., stearates, oleates, palmitates, ricinoleates, sebacates, and the like) of cations (D), the so-called metallic soaps.

(C) *Halogen donor.*—The class of halogen donors contains such compounds as those of the types $RX_n$, $RX_n.HX$ and $RX_n.HX'$, where R is a cation such as $NH_4$, an alkali element, an alkaline earth element (D) or a heavy metal (D), n is the valence of R, and X is a halogen (X' being a different halogen). Also included are such substances as elemental bromine and iodine, halogen acids (e.g., bromic acid and iodic acid), and stable anhydrides thereof (e.g., iodine pentoxide).

Useful halogen donors include stable, preferably solid iodine and bromine halides; also, ammonium silicofluoride. Oxyhalides may behave both as halogen donors and as oxidants, e.g., alkali bromates and iodates, as mentioned supra. Halogenated organic acids may function both as halogen donors and as fuels. Examples of these CB-type reactants include mono- and tri-chloroacetic acids, trifluoroacetic acid, pentafluoropropionic acid, and heptafluorobutyric acid; another CB-type reactant is pyridinium bromide perbromide. Halogenic smokes of mixed composition are obtained by use of two or more halogen donors, originating in either two or more separate substances or in a single compound of suitable characteristics. In all of the halogen donors the halogen occurs in a generally easily available state or form.

(D) *Halogen receptor.*—The class of halogen receptors generally includes easily reducible compounds, organo-metallic compounds, or easily decomposed or thermo-labile substances in which predominates the particular, distinctive element, often though not always as a cation, which is included in or enters the final make-up of the halogenic smoke, as for example listed previously under (A), (B) and/or (C). The halogen receptor can often be employed in an elemental state (e.g., Bi, Sb, As, In, Zn) or as an alloy (e.g., (Ag, Au) Te$_3$). Double salts are useful in producing smokes of mixed composition.

Also operable are many compounds in which the halogen receptor is derived from an oxygenated anion (e.g., vanadates, selenates). Minerals which contain the more common elements, also mineral alloys, are often very satisfactory as halogen receptors. In my laboratory studies, rare element smokes were frequently produced from suitable rare element minerals.

In the halogen receptors the receptor element occurs in a generally easily available state or form. Fundamentally, the halogen receptor element or its combinations with other elements, including halogens, is halogen reactive. The halogen receptor may contribute to the heat of reaction, partially behaving as a class B component, according to its ease of oxidation; also, according to the amount and nature of the oxidant, and especially to the relative oxidizability of the fuel with respect to the particular halogen receptor.

The several hundred examples given later include a substantial number and variety of other representatives of the four classes, A, B, C and D.

One modification of the present improvement embraces the selection and use of a reactant which, in addition to qualifying by its class A, B, C or D property (or combination of class properties) exhibits sublimability (when solid) or volatility (when liquid) coupled with some special or unique characteristic. It is not necessary to discuss this modification in detail, as those skilled in the art will be able to amplify it according to the application or needs. However, the following are examples of reactants which fall within the purview of this particular modification:

Organic dyes and dye intermediates, such as anthraquinone derivatives like auramine O, beta-naphthaleneazodimethylaniline, alpha-aminoanthraquinone, 9-diethylaminorosindone and 1-methylaminoanthraquinone, class B (colored smoke production); polynuclear, cyclic hydrocarbons such as phenanthrene, pyrene, 1,2-benzanthracene, 1,2,5,6-dibenzanthracene and 9,10-dimethyl-1,2-benzanthracene, class B (all fluorescent, the three last-named being carcinogenic); diphenylchlorarsine, class BD (sternutator); ethanethiol, class B (stench); chloropicrin, class BC (lung irritant); bromobenzylcyanide, class BC (lachrymator); lewisite, class BCD (vesicant); mustard, class B (vesicant); and the like.

These volatile components, supra, additional examples of which are set out in the following listing, are used in the usual manner, or, they are added in increased amounts to the admixture which, in turn, contains increased quantities of oxidant and fuel. The volatilization and escape from the reacting mass occurs concurrently with the formation and evolution of the halogenic smoke.

Certain of the examples given subsequently carry other substances which may be grouped under the general term of "optional additives." These additives include fluxes, cooling agents and metathesizing agents, to assist in the formation and release of smoke. For example, alkali acid sulfates, e.g., KHSO$_4$, are useful for this purpose, as are alkali bicarbonates and oxalates.

An excess of halogen donor is sometimes necessary in the formulation to provide an atmosphere of halogen, especially bromine and iodine. As will be recognized by those skilled in the art, some halides are not exceptionally stable under the conditions of the high-temperature solid state reaction in the absence of halogen atmosphere.

A reduction of the oxidant-fuel content of an admixture tends to favor a flameless reaction. This kind of reaction generally assists in the formation and emission of those halogenic smokes liable to decomposition under the conditions of the higher temperature or flaming reaction. By use of this principle, two different kinds of halogenic smokes, from a compositional standpoint, may be produced from a given element or variety of admixture (see "ammonium" for example).

The smoke yields from a given admixture may vary somewhat. Such variation appears to involve several factors. Among these is the presence of water in the admixture. Water, as an impurity or as water of hydration, may be desirable or undesirable, according to the case. Small amounts of water are undesirable when one or more of the reactants is water-sensitive, reacts with the water and so loses a part of its identity: Large amounts of water are undesirable in that a premature reaction may occur between water soluble components. Those reactants which are water-sensitive will be readily identified by the artisan. In such cases anhydrous materials are used. Usually, however, small amounts of water have no effect in admixtures employed soon after compounding.

In certain cases, as in the examples given under "ammonium," "chromium," and "vanadium," the addition of one of the components initiates the deflagration. In these instances, the ingredient which triggers the reaction is kept apart from the other components until the reaction is desired. The means by which this is achieved are well known, as for example keeping the triggering component sealed within a frangible glass container, this container being in contact with or embedded within the other reactants, and initiating the reaction upon breakage of the container; or, by use of a slowly dissoluble partitioned container; or, the like.

In the following listing, by elements, the smoke and sublimate colors often indicate simple, well-defined halides. In other instances the more complex or mixed halides are indicated. That the smoke contained the element in question was, when the smoke was not typical of a known compound, established by a variety of physical and chemical tests, including the use of the halogen receptor elements in radioactive form.

In the following several hundred examples the ingredients were taken in powder form and gently and uniformly admixed. When one of the components was liquid or semisolid the resulting admixture often had a paste-like consistency, which did not interfere with the burning qualities. All parts refer to parts-by-weight.

For convenience, the following examples are consecutively numbered.

*Actinium.* — An actinium-lanthanum concentrate was used in tests to produce smokes bearing this element. An actinium base mix was prepared by blending 0.3 part of actinium concentrate with 4.0 parts of sulfur and 8.0 parts of potassium chlorate. Fluoride: (1) 0.5 part of ammonium acid fluoride and 3.0 parts of actinium base mix burned fairly slowly, with a tendency to flameless reaction, giving a good grey smoke. Chloride: (2) Same as fluoride except that monochloroacetic acid was used as the halogen donor; burned well with some flaming, giving a grey smoke and a grey-white sublimate. Bromide: (3) 0.5 part of potassium bromide, 0.5 part of potassium bromate and 3.0 parts of actinium base mix were blended together; this burned very well with some flaming, and gave a heavy, copious whitish smoke. Iodide: (4) Same as bromide, except that iodide and iodate were used; good burning with some flaming, giving a heavy, copious lavender-white smoke which quickly changed to a light tan color, finally fading to a white which had a slight green tinge. All of these actinium smokes and their sublimates were strongly radioactive, those of bromine and iodine being especially so.

*Aluminum.*—A number of inorganic and organic aluminum compounds were employed in the study of this element, among them being the nitrate, fluoresceinate, isopropylate, oleate, stearate, tristearate, sulfate, and chloride, with and without fluxing agents. Fluoride: (5) Aluminum fluoresceinate (0.4 to 0.7 part), potassium chlorate (0.8 to 1.5 part) and ammonium acid fluoride (0.4 to 0.7 part) blended together; gave a white, acrid smoke and grey-white sublimate. Chloride: (6) Potassium or sodium chlorate (1.7 part), ammonium chloride or trichloroacetic acid (0.8 part), sulfur (1.2 part) and aluminum chloride or nitrate (1.2 part) blended together; when ignited by a burning magnesium ribbon the admixture gave a heavy white smoke and an abundant white sublimate. Bromide: (7) Equal parts of aluminum sulfate, potassium chlorate and sodium bromate blended together, or, (8) equal parts of aluminum isopropylate, potassium chlorate and sodium bromate blended together; these mixtures gave a yellow to yellow-grey smoke, the yellowness being more evident when larger amounts of halogen donor were present. Iodide: (9) Aluminum fluoresceinate (0.5 to 0.8 part), alkali iodide (0.5 part), alkali iodate (1.0 part), alkali chlorate or perchlorate (1.0 part) and sulfur (1.0 part); gave a good burning mixture, and yielded a smoke and sublimate of color between dense orange-brown and yellow-brown.

*Ammonium.*—The ammonium cation behaves like metals in the present improvement, as might be expected. The following admixtures are representative of those which yield ammonium smokes, it here being noted that the ammonium smokes may be used cooperantly with other admixtures set out herein, providing a mixed smoke. Fluoride: (10) The admixture of ammonium chloride (1.0 part), sulfur (1.0 part), potassium chlorate (2.0 parts) and pentafluoropropionic acid (1.5 parts) had a tendency to deflagrate spontaneously, and this can be avoided by adding the acid to trigger the reaction at the moment smoke production is desired; the composition evolved a heavy, abundant, acrid grey smoke. (11) The admixture of ammonium acid fluoride (2.0 parts), dextrin (1.0 part), potassium chlorate (3.0 parts) and ammonium carbonate (1.0 part) burned with the release of a grey smoke. Chloride: (12) The admixture of ammonium chloride (1.0 part), dextrin (1.0 part), potassium chlorate (1.0 part) and monochloroacetic acid (1.0 part) had a tendency to a flameless reaction which emitted a fine, voluminous, bright white smoke. (13) The admixture of ammonium carbonate (1.5 parts), sulfur (1.0 part) potassium chlorate (1.5 parts) and monochloroacetic acid (1.5 parts) emitted a fine white smoke, like that of No. 12. Bromide: (14) The admixture of ammonium carbonate (1.5 parts), ammonium bromide (1.0 part), dextrine (1.0 part), potassium bromate (2.0 parts) and potassium chlorate (1.0 part) burned with the emission of a copious white smoke. Iodide: (15) The admixture of ammonium iodide (1.0 part), potassium iodate (0.5 part), ammonium carbonate (0.5 part), sulfur (1.0 part), potassium iodide (1.0 part) and potassium chlorate (0.5 to 1.5 parts) behaved variously, according to the amount of oxidant, this serving as an example of a similar variation encountered with other elements herein set forth (though not recited in detail); with 0.5 part of potassium chlorate the composition gave a flameless deflagration, emitting a vari-colored, dense and voluminous smoke, the color ranging from a base grey, tinged with yellow, to a base grey tinged with green and orangish; with 1.5 parts of potassium chlorate the deflagration was more vigorous, with flaming, giving a heavy, copious orange-brown smoke. The sublimate carried small bright, mirror-like iridescent particles.

*Antimony.*—In all of the following examples the source of the antimony may be the finely powdered metal or a compound such as antimony potassium tartrate, in the latter case the organic component also contributing as the fuel. The smokes of antimony are all toxic. Fluoride: (16) Antimony potassium tartrate (2.0 parts), potassium chlorate (4.0 parts) and ammonium acid fluoride (1.0 part) gave a good burning composition which had a tendency to a flameless reaction, evolving a heavy, copious blue-grey smoke. Chloride: (17) Same as the fluoride composition, except that trichloroacetic acid replaced the fluoride donor; this gave a similar smoke, except for a yellowish color. Bromide: (18) Antimony powder (1.0 part), sulfur (1.0 part), potassium bromide and potassium bromate (1.2 parts each); gave a very fast burning mixture, flamed, and evolved a yellow-greenish smoke that formed a greenish-white sublimate. Iodide: (19) Antimony powder (0.8 part), willow charcoal (0.5 part), potassium iodide and potassium iodate (1.0 part each); gave a slow burning mixture which yielded a heavy, copious yellow-green smoke and sublimate.

*Arsenic.*—The arsenic smoke producing compositions are adapted to industrial fumigation and to chemical warfare uses, in view of their high toxicity. Suitable organo-arsenic compounds, described previously, provide a chemical warfare type agent of dual characteristics. Fluoride: (20) Arsenious oxide (1.0 part) potassium or sodium chlorate or perchlorate (4.0 to 6.0 parts), dextrin or sulfur (3.0 to 4.0 parts), ammonium acid fluoride or pentafluoropropionic acid (1.8 to 2.5 parts) blended together; gave a good blue-white smoke in a reaction that may border on the explosive when large amounts of oxidant and fuel are used, also, some oiliness in the sublimate when the halide donor is used in large amounts. Chloride: (21) Same as the fluoride admixture, except that trichloroacetic acid replaced the fluoride donor; burned very quickly, evolving a white-grey smoke and giving a good yellow, almost oily sublimate. Bromide: (22) Arsenic powder (0.6 part), potassium bromide and potassium bromate (0.7 part each) and sulfur (0.5 part); good burning, providing a grey-white smoke and sublimate which had a slight yellow to pale green tinge. Iodide: (23) Arsenious oxide (1.0 part), ammonium iodate (0.7 part), potassium iodide (0.3 part), lactose (1.0 part); gave a heavy red-brown sublimate and smoke ranging into the grey-tan. (24) Equal parts of powdered arsenic, potassium iodide, potassium iodate and sulfur; gave a mixture which upon burning evolved a fine yellow-green smoke. (25) The addition of 0.5 part of alkali chlorate produced a faster burning admixture. Mixed smokes of high toxicity were also obtained by use of lead arsenate and comparable compounds.

*Barium.*—A base mixture comprised barium stearate (3.0 parts), potassium chlorate (10 to 15 parts) and halogen donor (4 to 7 parts). Fluoride: (26) Using ammonium acid fluoride as the halogen donor, the admixture gave a grey smoke and sublimate. Chloride: (27) Using tri- or mono-chloroacetic acid as the halogen donor, the mixture gave a grey smoke and sublimate. Bromide: (28) Using potassium bromide and bromate (50:50) as the halogen donors, the mixture gave a good, fast burning composition which yielded a heavy, copious white smoke and thick heavy sublimate. Iodide: (29) Using potassium iodide and iodate (50:50) as the halogen donors, the composition burned readily and gave a fine, heavy white smoke and thick sublimate.

*Beryllium.*—Fluoride: (30) Beryllium sulfate (1.5 parts), sulfur (1.5 parts), potassium chlorate (3.0 to 3.5 parts) and ammonium acid fluoride (2.0 parts) gave a generally flameless, slow burning mixture which evolved a very heavy, copious slate colored smoke and sublimate. (31) A slightly different smoke formed when the halogen donor was sodium silicofluoride (1.0 parts); this gave a pale yellow to grey smoke and sublimate. Chloride: (32) When the halogen donor in No. 30 was trichloroacetic acid, the mixture was slow burning, evolving a grey smoke and sublimate. Bromide: (33) Beryllium sulfate (1.5 parts), potassium chlorate (2.0 parts), and 1.0 part each of sulfur, potassium bromide and potassium bromate; gave a good burning mixture which showed little flaming but released a copious, heavy deep yellowish smoke and formed a good yellow sublimate. Iodide: (34) Potassium iodide and iodate as the donors in No. 33 gave a good burning mixture which emitted a smoke which was deep peach, orange and finally chocolate, as was also the sublimate.

*Bismuth.*—A base admixture was prepared from bismuth oxide (1.5 parts), potassium chlorate (2.5 to 3.0 parts), sulfur (1.0 to 1.5 parts) and halogen donor (1.0 to 1.5 parts); this gave a good burning and smoke producing composition. Fluoride: (35) Using ammonium acid fluoride (1.5 parts) as the halogen donor, the mixture burned with a bluish flame, yielding a pale blue-white smoke and heavy sublimate. (36) With the halogen donor as heptafluorobutyric acid (1.0 to 1.5 parts), the results were similar. Chloride: (37) With monochloroacetic acid (1.0 part), the admixture emitted a dense blue-white smoke and formed a sublimate which was slightly yellowish at first. Bromide: (38) Equal parts of powdered bismuth, sulfur, potassium bromide and potassium bromate gave a fast burning composition which evolved a fine yellow-green to yellow smoke and sublimate. Iodide: (39) The base mixture, with potassium iodide (1.5 parts) as the halogen donor, gave a fast burning composition which yielded a copious vari-colored smoke and brown sublimate, with some violet-brown, peach and orange colorations, a very heavy chocolate colored smoke lingering after the deflagration. (40) Equal parts of powdered bismuth, sulfur, potassium iodide and potassium iodate was slow burning, but gave a fine heavy and abundant reddish-chocolate colored smoke and sublimate.

*Cadmium.*—A base composition contained cadmium stearate or cadmium ricinoleate (3.0 parts), potassium chlorate (9.0 to 11.0 parts) and halogen donor (4.0 to 6.0 parts). Fluoride: (41) With ammonium acid fluoride (4.0 parts) the mixture burned at a moderate rate (with about 9.0 parts of oxidant); gave a copious grey-white smoke. Chloride: (42) With mono- or tri-chloroacetic acid (6.0 parts) the mixture burned well with some flaming; evolved a heavy and abundant blue-white to slate colored smoke and sublimate. Bromide: (43) The base admixture with potassium bromide and potassium bromate (50:50; 4.0 parts) was good burning, yielding a heavy, copious pale yellow smoke and sublimate. (44) Equal parts of cadmium chloride, potassium bromide, potassium bromate and sulfur gave a slow burning mixture which emitted a large amount of heavy deep yellow smoke. Iodide: (45) The base admixture with potassium iodide and potassium iodate (50:50; 4.0 parts) was good burning, yielding a heavy, abundant pale peach to flesh-colored smoke and sublimate. (46) Equal parts of cadmium chloride, sulfur, potassium iodide and potassium iodate gave a slow burning mixture which evolved a pale peach to pale brown colored smoke and sublimate.

*Calcium.*—The sublimates of all tests made on calcium smokes gave very strong ferrocyanide tests for calcium. In addition, radioactive calcium was also employed concurrently with Fe-55 (see "iron") in producing radioactive smokes of mixed composition. Fluoride: (47) Calcium stearate (3.0 parts), potassium chlorate (18.0 to 20.0 parts) and ammonium acid fluoride (4.0 to 5.0 parts); gave a mixture which burned fairly slowly, giving a good slate colored smoke and sublimate. Chloride: (48) Calcium stearate (3.0 parts), potassium chlorate (12.0 to 17.0 parts) and either mono- or tri-chloroacetic acid (5.0 parts) gave a mixture which burned with the emission of a slate smoke; some soot may be evolved when insufficient oxidant is present. Bromide: (49) Calcium stearate (3.0 parts), potassium chlorate (17.0 parts), potassium bromide (5.0 parts), sodium bromate (5.0 parts) gave a mixture which burned vigorously, with flaming, yielding a heavy, abundant smoke and sublimate which had a slight yellowish to greenish tinge. Iodide: (50) By replacing potassium iodide and potassium iodate, in No. 49, as the halogen donors, a vigorous burning mixture was obtained, giving a heavy, copious lemon colored smoke and sublimate.

*Cerium.*—A number of cerium and rare earth compositions were tested. For other representative compositions set out herein see "rare earths" and "thorium." The rare earths are of particular interest in view of the fact that they account for at least one-third of the radioactivity of the products of nuclear fission. Fluoride: (51) An admixture of cerium nitrate or cerium earths oxalate (1.0 part), sulfur (2.0 parts), potassium chlorate (3.0 to 4.0 parts) and ammonium acid fluoride (1.5 parts) burned (with a tendency to a semiflameless reaction) with the evolution of a good grey to pale grey-tan smoke and sublimate. Chloride: (52) An admixture of cerium nitrate (1.0 part), sulfur (2.0 parts), potassium chlorate (3.0 parts) and monochloroacetic acid (1.5 parts) burned well, with some flaming, yielding a heavy, voluminous lemon-yellow smoke and sublimate which may range into cream and tan colors. Bromide: (53) Using potassium bromide as the halogen donor in No. 52 gave a good burning composition (tendency to flameless deflagration), evolving a heavy, copious bright yellow smoke and sublimate. (54) With a mixture of approximately equal parts of cerium earths oxalate, potassium bromide, potassium bromate and sulfur, the burning rate was moderate, but a dense whitish smoke was produced. Iodide: (55) A mixture of approximately equal parts of cerium earths oxalate, potassium iodide, potassium iodate, potassium chlorate and sulfur burned with the emission of a fine peach colored smoke which quickly turned red-brown, the sublimate also being red-brown.

*Chromium.*—Fluoride: (56) Chromium stearate (1.5 to 3.0 parts), potassium chlorate (4.0 to 12.0 parts) and ammonium acid fluoride (2.0 to 8.0 parts) gave a good burning (flamed) admixture which released a heavy, copious very pale lavender-grey smoke and sublimate. Chloride: (57) Using mono- or tri-chloroacetic acid as the halogen donor in No. 56, the composition gave a greyish-black to blackish smoke. Bromide: (58) Equal parts of chromic oxide, potassium chlorate, potassium bromide, potassium bromate, sulfur and potassium acid sulfate gave a very fast burning admixture which emitted a heavy greyish smoke. (59) Upon the addition of chromic oxide (1.0 part) to the admixture of potassium bromate (1.0 part), sulfur (1.0 part) and potassium bromide (1.0 part) the deflagration started spontaneously, proceeding very quickly, and emitting a whitish smoke. Iodide: (60) Equal parts of chromic oxide, potassium chlorate, potassium iodide, potassium iodate and sulfur gave a fast deflagrating mixture (flamed) which evolved a heavy, abundant deep violet then purple-grey smoke and sublimate.

*Cobalt.*—A base mix contained cobalt stearate (2.0 parts), potassium chlorate (10.0 to 12.0 parts) and halogen donor (4.0 to 8.0 parts). Fluoride: (61) With ammonium acid fluoride as the halogen donor the mixture was very fast burning (flamed), giving a heavy, voluminous fine white smoke. Chloride: (62) With monochloroacetic acid (4.0 parts), the mixture had a flash-like burning rate, emitting a heavy, copious blue-white smoke. Bromide: (63) Equal parts of cobalt chloride, potassium bromate, potassium bromide, sulfur and potassium perchlorate gave a slow burning mixture which released a grey smoke. (64) Equal parts of cobalt nitrate, potassium bromate, potassium bromide, sulfur, potassium chlorate and potassium acid sulfate burned with the emission of a green to green-brown smoke. Iodide: (65) A mixture of cobalt chloride (1.0 part), potassium chlorate (2.0 parts), potassium iodate (1.0 part), potassium iodide (1.0 part) and sulfur (1.5 parts) burned well and evolved a heavy, voluminous deep violet smoke which formed a deep violet sublimate.

*Columbium.*—Several different columbium compounds were used in the investigation of this element, including columbic acid and iron manganese columbate. The columbium bromide smokes were all observed to be very irritating to the eyes, acting as lachrymators. Columbium is one of the important radioactive products of nuclear fission. Fluoride: (66) Columbic acid (1.0 part), ammonium acid fluoride (1.0 part), potassium chlorate (3.0 to 5.0 parts), sulfur (1.0 part); this mixture burned at a moderate rate with some flaming, emitting a copious grey smoke. (67) Iron manganese columbate (1.0 part), sodium silicofluoride (1.0 part), sodium chlorate (5.0 parts), sulfur (1.0 part); burned moderately with flaming, emitted a grey smoke. Chloride: (68) This mixture was the same as No. 66, except that mono- or tri-chloroacetic acids were used as the halogen donors; varied in burning rate, giving a grey smoke. (69) This mixture was the same as No. 66, except that calcium hypochlorite was used as the halogen donor; slow burning, yielding a small amount of grey smoke. Bromide: (70) Columbic acid (1.5 parts), sulfur (1.5 parts), potassium chlorate (2.0 parts) and potassium bromide (1.5 parts); burned readily, emitting a tan smoke which was strongly lachrymating. (71) Columbic acid (1.5 parts), sulfur (1.5 parts), potassium chlorate (2.0 parts), potassium bromide (1.5 parts) and potassium bromate (1.0 part); burned fast, yielding a copious amount of brownish smoke. Iodide: (72) An admixture of columbic acid (1.0 part), sodium or lithium chlorate (2.5 to 3.0 parts), sulfur or like fuel (1.0 part) and sodium or lithium iodide (1.0 part) gave a good burning composition which yielded a lavender smoke and sublimate.

*Copper.*—A number of copper compositions were investigated, including radioactive copper admixed with Fe-55 (see "iron"). A base mix contained copper stearate (5.0 parts), potassium chlorate (15.0 parts) and halogen donor (3.0 parts). Flouride: (73) Using ammonium acid fluoride (2.0 to 2.5 parts) the mixture burned with the evolution of a grey smoke. (74) A mixture of cuprous chloride (1.5 parts), potassium chlorate (4.0 parts), sulfur (2.0 parts) and ammonium acid fluoride (2.0 parts) burned very quickly, emitting a fine heavy, abundant smoke of pale pink color which shortly changed to greywhite, depositing a heavy sublimate. Chloride: (75) With mono- or tri-chloroacetic acid as the halogen donor in the base mix, supra, preferably about 3.0 parts, the composition burned readily and yielded a copious grey or slate colored smoke and sublimate. (76) A mixture of cuprous chloride (1.5 parts), potassium chlorate (3.0 parts), sulfur (1.0 part) and monochloroacetic acid (1.0 part) burned with a green flame and evolved a slate smoke. Bromide: (77) With potassium bromate and potassium bromide (2.0 and 4.0 parts respectively) in the base mix, supra, the composition was good burning and gave a heavy, copious slate-white smoke and sublimate. (78) Equal parts of cuprous oxide, potassium chlorate, sulfur, potassium bromide and potassium bromate gave a quick burning mixture (much flaming), yielding a pale violet-grey smoke which turned tan-grey. (79) Another bromide mixture contained equal parts of cupric fluoresceinate, dextrin, potassium bromide and potassium bromate; this gave a tan colored smoke and a tan to greenbrown colored sublimate. Iodide: (80) With potassium iodate and sodium iodide (4.0 and 2.0 parts respectively) as the halogen donors in the base mix, supra, a good burning composition was obtained; this emitted a heavy, voluminous smoke which was pink-white streaked with an orange-brown tinge, the sublimate being whitish to tan-white. (81) Another admixture contained cuprous oxide (1.0 part), potassium chlorate (2.0 to 2.5 parts), potassium iodate (1.0 part), potassium iodide (1.0 part) and sulfur (1.0 part); this burned rapidly with a blue flame, releasing a deep violet smoke and formed a sublimate which faded to peach-brown. Mixed: (82) A mixed copper smoke was released upon the deflagration of an admixture of cuprous acetate (1.3 parts), potassium iodide (0.6 part), potassium iodate (0.6 part), potassium bromate (0.7 part), potassium or sodium chlorate (0.5 to 1.0 part) and sulfur or charcoal (0.5 to 0.8 part); the abundant smoke was violet-grey, the sublimate brownish.

*Dysprosium.*—As of the "rare earths."
*Erbium.*—As of the "rare earths."
*Europium.*—As of the "rare earths."
*Gadolinium.*—As of the "rare earths."
*Germanium.*—All of the germanium smokes have a very peculiar odor, not quite sulfurous and not quite like radish. Fluoride: (83) A mixture of germanium dioxide (0.1 part), sodium chlorate (3.0 parts), sulfur (2.5 parts) and ammonium acid fluoride (1.0 part) burned with a tendency to a flameless reaction; a copious, pungent greyish smoke and sublimate were produced. Chloride: (84) Using monochloroacetic acid as the halogen donor in Formula No. 83 gave a composition which at first burned with a tendency to a flameless reaction, emitting a heavy, voluminous greyish smoke, then reacting more vigorously with some flaming and releasing a flesh-tan to yellow-tan colored smoke. Bromide: (85) A mixture of germanium dioxide (0.1 part), sodium chlorate (3.0 parts), sulfur (2.5 parts), potassium bromide (1.0 part) and potassium bromate (1.0 part) burned readily (flamed), emitting a heavy, copious pale yellow to yellow-tan smoke and providing a yellowish sublimate. Iodide: (86) A mixture of germanium dioxide (0.1 part), sodium chlorate (3.0 parts), sulfur (2.5 parts), potassium iodide (0.4 part) and potassium iodate (0.4 part) gave a good burning composition (some flaming) which released a heavy, voluminous lavender smoke streaked with orange and black, and a sublimate of similar colorations.

*Gold.*—In one series of gold smokes a gold base mix was prepared from gold trichloride (0.5 part), sulfur (5 parts), and potassium chlorate (10 parts); this was divided into four equal batches. Mixed tests of gold, silver and tellurium were also made, and the results of these are set out under the latter element. Fluoride: (87) Gold base mix (3.8 parts) and ammonium acid fluoride (0.6 part) burned slowly, emitting a heavy, voluminous pale yellow smoke and forming a yellowish sublimate, the yellow deepening into lemon for both smoke and sublimate; tendency to a flameless reaction. Chloride: (88) Gold base mix (3.8 parts) and trichloroacetic acid (1.0 to 1.5 parts) gave a mixture which burned readily, releasing a fine, abundant, heavy pale yellow to lemon-yellow smoke which formed a yellow to lime-yellow colored sublimate. Bromide: (89) Gold base mix (3.8 parts) and potassium bromide (0.8 part) burned readily with a flame, evolving a heavy, copious yellow to yellow-tan smoke tinged with slight greenish-yellow and grey yellow, the same colors being possessed by the sublimate. Iodide: (90) Gold base mix (3.8 parts) and potassium iodide (0.5 part) burned well (flamed), forming a heavy smoke and sublimate which ranged from a dichroic greenish-black (deep red by transmitted light) to a heavy reddish color.

*Hafnium.*—As of "zirconium."
*Holmium.*—As of the "rare earths."
*Indium.*—Fluoride: (91) A mixture of powdered indium metal (0.3 part), sodium chlorate (3.0 parts), sulfur (2.0 parts) and ammonium acid fluoride (1.0 part) burned fairly well with a tendency to a flameless reaction, emitting a copious grey smoke which had a pale yellow tinge and formed a pale yellowish sublimate. Chloride: (92) A mixture of powdered indium metal (0.3 part), sodium chlorate (3.0 parts), sulfur (2.0 parts) and mono- or tri-chloroacetic acid (1.0 part) gave a good burning composition which evolved a heavy, copious smoke which at first appeared pale purple-red but quickly turned to a grey or grey-yellow, forming a sublimate of the same colors and having a peculiar odor. Bromide: (93) A mixture of powdered indium metal (0.4 part), sodium chlorate (3.0 parts), sulfur (2.0 parts), potassium bromide (1.0 part) and potassium bromate (1.0 part) gave a good burning mixture which yielded a grey smoke and sublimate. Iodide: (94) A mixture of powdered indium metal (0.4 part), sodium chlorate (3.0 parts), sulfur (2.0 parts) and potassium iodide (1.0 part) burned easily with flaming, emitting a heavy, copious deep peach to copper colored smoke which formed a sublimate having a copper color with some canary yellow tinges.

*Iron.*—Numerous tests were made with various iron compounds, including radioactive iron (Fe-55) derivatives (e.g., as soap, salicylate, chlorides, nitrates) in pure form as well as Fe-55 derivatives which carried about one percent of each of the following elements: Mn, Ca, Si and Cu. The presence of Fe-55 and the other elements in the smokes and sublimates prepared from various mixes was readily demonstrated by means of the Geiger counter; in the non-radioactive forms simple chemical tests (e.g., the ferrocyanide test) established the existence of iron in the smokes and sublimates. However, the amount of iron varied a good deal between the smokes and sublimates produced by the deflagration of the different admixtures. The following are examples of some of the compositions investigated:

(I) Iron stearate (3.0 parts), potassium chlorate (12.0 parts) and halogen donor (5.0 parts).
(II) Iron-55 salicylate (5.0 parts), potassium or sodium chlorate (15.0 parts) and halogen donor (8.0 to 10.0 parts).
(III) Ferric chloride (0.5 to 1.2 parts), potassium chlorate (1.0 parts), sulfur (1.0 part) and halogen donor (1.5 to 2.0 parts).
(IV) Iron-55 soap (5.5 parts), sulfur (5.0 parts), potassium chlorate (20.0 parts) and halogen donor (as indicated below).

Fluoride: (95) Base mix (I) with ammonium acid fluoride as the halogen donor evolved a blackish smoke; (96) mix (II) with the same donor burned with a tendency to a flameless reaction, emitting a heavy, abundant pale tan-white smoke which formed a brownish sublimate; (97) mixture (III) with the same donor gave a voluminous tan smoke; (98) 12.0 parts of mixture (IV) with ammonium acid fluoride (4.0 parts) and sulfur (2.0 parts) burned with the emission of a heavy, copious smoke which had a tan color, turning grey when wet with water. Chloride: (99) Mixture (I) with mono- or tri-chloroacetic acid gave a good burning (flamed) composition which evolved a grey to blackish smoke which had a slight reddish tinge; (100) mixture (II) with the same halogen donor burned very readily, giving an abundant dirty yellow to pale yellow-brown smoke which formed a sublimate of the same color, turning red-yellow to yellow and finally brick or grey-black in the presence of water, the sublimate from the monochloroacetic acid having roughly 60 percent more radioactivity than that produced with the trichloroacetic acid; (101) mixture (III), using potassium chloride as the halogen donor, burned very fast with much flaming, emitting a grey-white smoke which formed a brown sublimate that turned greenish-blue when wet (in this instance the fuel was lactose); (102) 6.0 parts of mixture (IV) and 2.0 parts of trichloroacetic acid burned with the evolution of a heavy, ample yellow-tan smoke which formed a sublimate of the same color, being tinged with brownish-orange and grey-brown and turning grey-black when moistened with water. Bromide: (103) Mixture (I) with 2.5 parts each of potassium bromate and potassium bromide burned very readily with the evolution of an abundant white smoke which formed a whitish sublimate; (104) mixture (II) with 5.0 parts each of potassium bromide and potassium bromate burned nicely with little flame, emitting a heavy grey smoke which formed a tan sublimate; (105) mixture (III) containing 1.0 part each of sodium bromide and sodium bromate burned easily with some flaming, emitting a fine medium yellow smoke; (106) 6.0 parts of mixture (IV) and 2.0 parts each of potassium bromide and potassium bromate burned readily, yielding a heavy whitish smoke having a tan-yellow tinge. Iodide: (107) Mixture (I) containing 2.5 parts each of potassium iodide and potassium iodate burned very well with some flaming, emitting a copious very pale yellowish-white smoke which formed a sublimate of the same color; (108) mixture (II) containing 4.0 parts of potassium iodide and 8.0 parts of potassium iodate released a heavy, voluminous smoke of color from deep yellow-brown to orangish, the sublimate of which turned black-brown in the presence of moisture; (109) mixture (III) with 0.5 part each of potassium iodide and potassium iodate burned with some difficulty, releasing a heavy, ample peach to tan colored smoke and sublimate; (110) 6.0 parts of mix (IV) with 3.0 parts of potassium iodate and 2.0 parts of potassium iodide burned satisfactorily, with some flaming, yielding a heavy, voluminous peach smoke and sublimate which turned red-brown with water.

*Lanthanum.*—For other compositions involving lanthanum smokes mixed with other elements see "actinium," "thorium," "rare earths," and "cerium." In one series of tests a base mix was prepared from lanthanum nitrate (0.5 part), sulfur (4.0 parts) and potassium chlorate (8.0 parts); this base mix was employed as follows. Fluoride: (111) Base mix (3.0 parts) and ammonium acid fluoride (0.8 part); this admixture burned slowly with some flaming, emitting a voluminous grey smoke which shortly changed to pale yellow. Chloride: (112) Base mix (3.0 parts) and monochloroacetic acid (0.5 part) burned well with some flaming, evolving a copious grey to whitish smoke. Bromide: (113) Mix (3.0 parts) and potassium bromide (0.8 part) burned at a moderate rate with some flaming, releasing a dense cream to pale yellow-cream smoke which condensed as a sublimate of the same color. Iodide: (114) Base mix (3.0 parts) and potassium iodide (0.5 part) was good burned, emitting a heavy vari-colored smoke, slight greenish to greenish-yellow at first, then changing to wine-reddish, and forming a wine-red and cream colored sublimate.

*Lead.*—A number of tests were made with lead, including the element in radioactive form. The lead smokes are toxic, and this property is enhanced when a compound such as lead arsenate is used in the formulation. Fluoride: (115) Lead sebacate (3.0 parts), potassium chlorate (7.0 parts) and ammonium acid fluoride (4.0 parts) evolved, in a flash reaction, a heavy, voluminous white smoke which formed a white sublimate. (116) Another lead smoke admixture contained lead acetate (1.5 parts), sodium chlorate (4.0 parts), sulfur (2.0 parts) and ammonium acid fluoride (2.0 parts); this burned quickly, emitting a bright white smoke and forming a white sublimate. Chloride: (117) Lead sebacate (3.0 parts), potassium chlorate (7.0 parts) and mono- or tri-chloroacetic acid (4.0 parts) emitted, in a flash reaction, a heavy, voluminous white smoke which formed a white sublimate. Bromide: (118) An admixture of approximately equal parts of lead acetate, sulfur, potassium bromide and potassium bromate burned quickly, emitting a pale yellow to yellow-grey smoke which formed a sublimate of the same color. (119) Approximately equal parts of radioactive lead nitrate, sulfur, potassium bromide and potassium bromate burned easily and rapidly, emitting a yellowish to yellow-grey radioactive smoke and forming a yellow to yellowish-grey radioactive sublimate. (120) Whiter lead smokes and sublimates were obtained from the deflagration of the admixture containing lead sebecate (3.0 parts), potassium chlorate (7.0 parts) and potassium bromide (4.0 parts). Iodide: (121) A beautiful deep yellow, voluminous smoke and sublimate formed upon burning lead acetate (2.0 parts), potassium chlorate (2.0 parts), potassium iodide (0.5 to 0.8 part), sulfur (0.8 to 1.2 parts) and potassium acid sulfate (0.5 part); (122) the addition of more halogen donor to No. 121 caused the smoke to become violet-grey.

*Lutecium.*—As of the "rare earths."

*Magnesium.*—Fluoride: (123) The admixture of magnesium stearate (2.0 parts), potassium chlorate (13.0 parts) and ammonium acid fluoride (5.0 parts) burned with the release of a grew-white smoke. Chloride: (124) The admixture of magnesium stearate (2.0 parts), potassium chlorate (13.0 parts) and trichloroacetic acid (5.0 parts) burned readily with the evolution of a good white smoke which condensed to a white sublimate. Bromide: (125) The admixture of magnesium stearate (2.0 parts), potassium chlorate (13.0 parts), potassium bromate (2.5 parts) and sodium bromide (2.5 parts) burned with some flaming, emitting a copious slate colored smoke which formed a slate colored sublimate. Iodide: (126) The admixture of magnesium stearate (2.0 parts), potassium chlorate (12.0 parts), potassium iodide (2.5 parts) and potassium iodate (2.5 parts) burned with the emission of a heavy white smoke which formed a thick white sublimate.

*Manganese.*—Several series of manganese smokes were prepared, including radioactive manganene (see "iron") as well as mixed smokes of this element (see "columbium"), of which the following are representative. Fluoride: (127) The admixture of manganese stearate (1.5 parts), potassium chlorate (5.0 parts) and ammonium acid fluoride (2.0 parts) burned with some flaming, emitting a grey smoke. Chloride: (128) The admixture of manganous sulfate (2.0 parts), potassium chlorate (3.0 parts), sulfur (2.0 parts) and monochloroacetic acid (2.0 parts) burned well, emitting a very slightly yellow-tinged grey smoke. Bromide: (129) The admixture of manganese stearate (1.5 parts), potassium chlorate (5.0 parts), potassium bromide (1.0 part) and sodium bromate (1.0 part) burned quickly, emitting a heavy white smoke. (130) The admixture of manganous acetate (1.0 part), potassium bromate (1.0 part), potassium bromide (0.4 part), sulfur (0.6 to 0.8 part) and potassium acid sulfate (0.4 part) burned quickly, giving a tan to greenish-tan smoke. Iodide: (131) The admixture of manganese stearate (2.0 parts), potassium chlorate (10.0 parts), potassium iodate (2.0 to 3.0 parts) and potassium iodide (1.0 to 2.0 parts) deflagrated vigorously, releasing a heavy, voluminous smoke that ranged from white to orange-brown color, forming a sublimate which had some dirty green-black and yellow-green colorations. (132) The admixture of manganous sulfate (1.5 parts), potassium chlorate (3.5 parts), sulfur (1.5 parts), potassium iodide (1.0 part) and potassium iodate (1.0 part) burned fast with some flaming, yielding a deep reddish to brownish smoke and sublimate.

*Mercury.*—Fluoride: (133) The admixture of mercurous chloride (3.0 parts), potassium chlorate (5.0 parts), dextrin (3.0 parts) and ammonium acid fluoride (3.0 parts) burned fast, yielding a fine grey-slate smoke which formed a deep grey-black sublimate. (134) The admixture of mercuric oxide (2.0 parts), sodium chloride (4.0 parts), sulfur (3.0 parts) and ammonium fluoride (3.0 parts) burned less vigorously but emitted a grey smoke which formed a grey sublimate. Chloride: (135) A mix of mercurous chloride (3.0 parts), potassium chlorate (5.0 parts), dextrin (3.0 parts) and monochloroacetic acid (4.0 parts) deflagrated quickly, emitting a whitish smoke which formed a greyish-tinged white sublimate; (136) with trichloroacetic acid (3.0 parts) in mix No. 135 the sublimate was more black and the smoke grey-white. (137) The admixture of mercuric oxide (2.0 parts), potassium chlorate (4.0 parts), sulfur (3.0 parts) and monochloroacetic acid (3.0 parts) burned vigorously, emitting a heavy deep brownish sublimate and a grey-tan smoke; (138) with trichloroacetic acid (3.0 parts) as the halogen donor in No. 137 the smoke was whiter. Bromide: (139) Approximately equal parts of potassium permanganate, sulfur, potassium bromide, potassium chlorate and mercurous chloride underwent violent deflagration, emitting a greyish smoke and forming a grey, opalescent sublimate; this smoke was opaque to 2537 A.U. ultra-violet light. (140) The admixture of mercuric fluoresceinate (1.0 part), potassium chlorate (1.0 part), potassium bromide (0.7 part), potassium acid sulfate (0.7 part) and sulfur (1.0 part) deflagrated readily, emitting a grey smoke. (141) The admixture of approximately equal parts of mercurous chloride, sulfur, sodium bromide and sodium chlorate deflagrated vigorously, emitting a thick off-white smoke which formed a thick greyish sublimate; this smoke was opaque to 2537 A.U. ultraviolet light. Iodide: (142) The admixture of approximately equal parts of mercurous chloride, sulfur, potassium iodide, and sodium chlorate burned vigorously, releasing a dense off-white smoke (2537 A.U. opaque) which formed a thick greyish sublimate. (143) The admixture of approximately equal parts of sugar (sucrose), potassium chlorate, potassium acid sulfate, potassium iodide and mercurous chloride deflagrated smoothly, yielding a greyish-brown smoke (2537 A.U. opaque) and a greyish sublimate. (144) The nature of the iodide smoke changes with the combustion of approximately equal parts (1.0) of mercurous chloride, potassium chlorate, together with sulfur (0.5 part), potassium iodide (0.3 part) and potassium acid sulfate (0.3 part).

*Molybdenum.*—Fluoride: (145) The admixture of equal parts of molydic acid, potassium or sodium chlorate, ammonium acid fluoride or ammonium fluoride, and sulfur or dextrin gave a slow burning composition which liberated a whitish smoke. Chloride: (146) Molybdic acid (2.0 parts), potassium chlorate (3.0 parts), sulfur (2.0 parts) and monochloroacetic acid (2.0 parts) burned readily with some flaming, evolving a copious slate smoke which formed a slate colored sublimate. Bromide: (147) The admixture of equal parts of molybdic acid, sulfur, potassium bromide and potassium bromate burned slowly but released a yellowish-grey smoke which turned yellow-green. Iodide: (148) The admixture of molybdic acid (0.5 part), potassium chlorate (1.0 part), potassium iodide (0.7 part), sulfur (0.5 part) and potassium acid sulfate (0.7 part) burned very quickly, yielding a fine rose-violet colored smoke.

*Neodymium.*—As of the "rare earths" and "cerium."

*Nickel.*—A number of nickel smoke producing compositions were investigated, including radioactive nickel, the following of which are examples. Fluoride: (149) Nickel stearate (1.0 part), potassium chlorate (2.5 parts), sulfur (1.5 parts) and sodium silicofluoride (1.0 part) burned very readily with flaming, emitting a heavy, copious pale dirty green smoke which turned dirty tan and formed a sublimate having similar colorations. (150) The composition set out under No. 149 yields a smoke which appears to be different from the nickel smoke released in the deflagration of the admixture of nickel stearate (1.5 parts), potassium chlorate (4.0 parts) and ammonium acid fluoride (2.0 parts), which emitted a fine, voluminous whitish to blue-white smoke. Chloride: (151) The admixture of nickel formate (1.5 parts), potassium chlorate (2.5 parts), sulfur (1.0 part) and monochloroacetic acid (1.5 parts) burned with some flaming, yielding a grey-white smoke. Bromide: (152) The admixture of nickel stearate (1.0 part), potassium chlorate (2.0 parts), potassium bromate (1.0 part), potassium bromide (1.0 part) and sulfur (1.5 parts) burned with some flaming, emitting a heavy, voluminous slate smoke tinged with yellow and yellow-green, and forming a pale greenish-tan sublimate. (153) The admixture of nickel stearate (1.0 part), potassium bromate (1.0 part), potassium bromide (0.3 part), potassium acid sulfate (0.3 part) and sulfur (0.5 part) burned slowly, emitting a dirty greenish smoke. Iodide: (154) The admixture of radioactive nickel dimethylglyoxime (1.0 part), potassium chlorate (1.0 part), potassium iodide (0.3 part), potassium acid sulfate (0.3 part) and sulfur (0.5 part) deflagrated with flaming, emitting a green-tinged grey-white smoke which formed a pale grey-green sublimate; the nickel dimethylglyoxime was made slightly radioactive by slow neutron irradiation. (155)

The admixture of nickel stearate (1.0 part), potassium chloride (2.5 parts), sulfur (1.5 parts), potassium iodide (1.0 part), potassium iodate (1.0 part) burned readily with much flaming, evolving a fine yellow to lemon-yellow smoke which formed a sublimate having a golden yellow color, tinged with some brownish.

*Osmium.*—All the osmium smokes possessed an extremely irritating and pungent odor. A base osmium mix was made from potassium and sodium osmate (50:50; 8.3 parts), sulfur (10.0 parts) and potassium chlorate (25.0 parts). Fluoride: (156) Osmium base mix (6.4 parts) and ammonium acid fluoride (3.0 parts) burned with a tendency to a flameless reaction, emitting an abundant tan-white smoke, forming a thick pale tan sublimate. Chloride: 157) Osmium base mix (7.0 parts) and monochloroacetic acid (2.0 parts) burned readily (some flaming), giving a copious light brownish smoke and sublimate. (158) Osmium base mix (7.0 parts) and trichloroacetic acid (2.0 parts) burned very quickly, giving a heavy light brown smoke and brownish sublimate. Bromide: (159) Osmium base mix (7.2 parts) and potassium bromide (2.0 parts) deflagrated in a flash reaction, emitting a heavy, copious slate smoke which turned tan and gave a tan sublimate. Iodide: (160) Osmium base mix (6.0 parts), potassium iodate (2.0 parts) and potassium iodide (1.0 part) deflagrated semi-explosively, giving a deep brown smoke and forming a sublimate which turned deep red-brown.

*Palladium.*—Fluoride: (161) The admixture of palladous chloride (0.2 part), sodium chlorate (3.0 parts), sulfur (2.5 parts) and ammonium acid fluoride (0.5 part) burned very well, giving a copious grey smoke which had a slight greenish tinge and which formed a sublimate of the same colorations. Chloride: (162) The admixture of palladous chloride (0.2 part), sodium chlorate (3.0 parts), sulfur (2.5 parts) and monochloroacetic acid (0.5 part) burned readily, yielding a dirty green-brown smoke which formed a sublimate of the same coloration. Bromide: (163) The admixture of palladous chloride (0.2 part), sodium chlorate (3.0 parts), sulfur (2.5 parts) and potassium bromide (0.5 part) burned vigorously, evolving a heavy, abundant smoke which was yellowish at first and then quickly turned yellowish-tan and formed a sublimate of the same color. Iodide: (164) The admixture of palladous chloride (0.2 part), sodium chlorate (3.0 parts), sulfur (2.5 parts) and potassium iodide (0.5 part) burned readily with some flaming, yielding a copious pale lavender smoke which faded to grey-tan and condensed as a brownish sublimate.

*Platinum.*—A master platinum mix was prepared from platinic ammonium chloride (2.6 parts), potassium chlorate (25.0 parts) and sulfur (15.0 parts). Fluoride: (165) Base mix (4.0 parts) and ammonium acid fluoride (1.2 parts) burned slowly (flamed), emitting a pale tan-grey smoke. (166) The admixture of platinum base mix (4.0 parts), ammonium acid fluoride (2.0 parts), potassium chlorate (2.0 parts) and petrolatum (1.0 part) deflagrated in a flameless reaction, emitting a heavy, very pale tan-grey smoke and forming a tan-grey sublimate. Chloride: (167) Platinum mix (4.0 parts) and monochloroacetic acid (1.0 part) burned readily (flamed), giving a grey smoke. (168) Platinum mix (4.0 parts) and trichloroacetic acid (2.0 parts) gave the same grey smoke. Bromide: (169) Platinum mix (4.0 parts) and potassium bromide (0.8 part) burned fast (flamed), producing a grey smoke and sublimate. (170) The admixture of platinum mix (4.0 parts), potassium bromide (1.0 part) and potassium bromate (1.0 part) gave a grey-tan smoke. (17) The admixture of platinum base mix (4.0 parts), potassium bromide, potassium bromate and potassium acid sulfate (each 1.0 part) burned easily (some flaming) producing a smoke having a browner color than others of this variety. Iodide: (172) The admixture of platinum mix (4.0 parts) and potassium iodide (0.5 part) burned readily (flamed), emitting a voluminous lavender-brown, then brown, smoke which formed a brown sublimate. (173) The admixture of platinum base mix (4.0 parts), potassium iodide and potassium iodate (each 1.0 part) burned easily with some flaming, evolving a copious smoke which was first lavender and then a peculiar shade of brown, forming a sublimate of the same brown tint.

*Polonium.*—Smokes carrying polonium (radium A) were formed in the investigation of radium salts (following).

*Praeseodymium.*—As of the "rare earths" and "cerium."

*Radium.*—In addition to carrying radium, the smokes of this variety also contained barium as well as disintegration products of radium (e.g., polonium). All of the smokes showed intense radioactivity. The radioactive smokes decreased in activity in roughly the following order: I, Br, Cl, F. See also the discussion set out under "uranium," "vanadium," "thorium," and the "rare earths." A base radium mix was prepared from radium barium sulfate (1.0 part), sulfur (4.0 parts) and potassium chlorate (8.0 parts), which was used as follows. Fluoride: (174) Radium mix (3.0 parts) and ammonium acid fluoride (1.0 part) burned in a semiflameless reaction, emitting a grey smoke; the addition of more oxidant increased the deflagration rate. Chloride: (175) The admixture of radium mix (3.0 parts) and monochloroacetic acid (0.8 part) burned easily with some flaming, evolving a grey smoke. (176) The blend of radium base mix (3.0 parts) and trichloroacetic acid (1.0 part) burned readily (flamed), emitting a grey-white smoke. Bromide: (177) The admixture of radium mix (1.5 parts) and potassium bromide (0.5 part) deflagrated at a moderate rate, giving a good grey-white to very pale yellowish-grey smoke. (178) A high activity smoke and radioactive sublimate were also obtained from the burning of approximately equal parts of potassium bromide, sulfur, potassium bromate and radium barium sulfate in admixture, the disintegration rate being fast and the abundant smoke being grey. Iodide: (179) Radium mix (3.0 parts), potassium iodide (0.5 part) and potassium iodate (0.5 part) burned quickly, emitting a heavy, copious lavender-brown then brown colored radioactive smoke.

*Rare earths.*—A variety of tests were made with the various rare earth and related elements, including pure rare earths and rare earth mixtures. Tests made with thorium-cerium earths are set forth under "thorium." Also, certain of the pure rare earths are set forth under their respective elements (e.g., Ce, La). The rare earths compounds employed in the studies, e.g., oxalates and rare earths soaps (stearate, oleate, palmitate and other fatty acids in admixture) contained the following elements and their respective percentages: La (7%), Ce (31%), Pr (5%), Nd (18%), Sm (7%), Eu (0.2%), Gd (7%), Tb (1%), Dy (7%), Ho (1%), Er (6%), Tm (1%), Yb (7%) and Lu (1.5%); although scandium and yttrium are not in the rare earth group of elements, they always occur in considerable quantities in rare earth minerals and in rare earth compounds, and hence are included here. It is pertinent to emphasize that the rare earths, including yttrium, account for approximately one-third of the radioactivity of the fission products from an atomic weapon. Fluoride: (180) The admixture of rare earth soaps (5.0 parts) and potassium chlorate (5.0 parts) with trifluoroacetic acid (3.0 parts) burned vigorously (flamed), yielding a copious, heavy smoke and sublimate, the smoke at first being a dirty green-black color, quickly darkening to a blackish color, and forming a blackish sublimate which appeared to have a semi-metallic luster. (181) The same heavy, dark smoke and sublimate resulted from the deflagration of potassium perchlorate (5.0 parts), sodium chlorate (1.0 part), rare earths soaps (5.0 parts) and trifluoroacetic acid (3.0 parts) in admixture. Chloride: (182) The admixture of rare earths oxalates (1.0 part), potassium chlorate (4.5 parts), sulfur (1.0 part) and monochloroacetic acid (1.0 part) burned readily with the emission of a grey smoke. (183) The same grey smoke was released upon the deflagration of rare earths oxalates (1.0 part), potassium chlorate (4.5 parts), sulfur (1.0 part), trichloroacetic acid (1.0 part) and sodium silicofluoride (1.0 part) in admixture. Bromide: (184) The admixture of rare earths oxalates (1.0 part), potassium chlorate (3.0 parts), sulfur (1.5 parts), potassium bromide (1.0 part) and potassium bromate (1.0 part) burned easily, releasing a grey smoke. Iodide: (185) The admixture of rare earth oxalates (1.0 part), potassium chlorate (3.0 parts), sulfur (1.0 part), potassium iodide (1.0 part) and potassium iodate (1.0 part) burned readily with the evolution of a lavender-brown smoke. Mixed: (186) A mixed rare earth halogen smoke was obtained from the deflagration of the admixture of rare earth oxalates (1.0 part), potassium chlorate (3.0 parts), potassium iodate (1.0 part), potassium iodide (1.0 part), sulfur (1.0 part) and ammonium acid fluoride (1.0 part), a heavy peach colored smoke being evolved. No. 183, supra, was also a mixed smoke.

*Rhenium.*—A base rhenium mix was prepared from rhenium nitrate (0.3 part), sulfur (2.0 parts) and sodium chlorate (2.0 parts) and employed as follows. Fluoride: (187) Rhenium base mix (1.0 part) and ammonium acid fluoride (0.3 part) burned at a moderate rate, emitting a copious grey smoke. Chloride: (188) Rhenium mix (1.0 part) and monochloroacetic acid (0.3 part) deflagrated vigorously, emitting a heavy grey smoke. Bromide: (189) Rhenium mix (1.0 part) and potassium bromide (0.3 part) burned at a moderate rate, evolving a grey smoke. Iodide: (190) Rhenium mix (1.0 part) and potassium iodide (0.3 part) burned moderately and released a pale lavender smoke.

*Rhodium.*—A base rhodium mix was prepared from rhodium chloride (0.3 part), sulfur (1.0 part) and potassium chlorate (2.0 parts) and used as follows. Fluoride: (191) Rhodium mix (0.75 part) and ammonium acid fluoride (0.2 part) burned at a medium rate, giving a greyish smoke. Chloride: (192) Rhodium mix (0.75 part) and trichloroacetic acid (0.2 part) burned at a moderate rate, emitting a greyish smoke which appeared to have a barely discernible reddish tinge. Bromide: (193) Rhodium mix (0.75 part) and potassium bromide and potassium bromate (0.2 part each) burned easily, giving a whitish-grey smoke. Iodide: (194) Rhodium mix (0.75 part) and potassium iodide and potassium iodate (0.2 part each) burned readily, yielding an off-white, slightly red-tinged smoke.

*Ruthenium.*—This element is another which accounts for a part of the radioactivity of fission products. The behavior of ruthenium in the present invention appears not unlike the other platinum metals. A base ruthenium mix was prepared from ruthenium tetraminohydroxychlorochloride (0.7 part), sulfur (5.0 parts) and potassium chlorate (10.0 parts) and used as follows. Fluoride (195) Ruthenium mix (3.0 parts) and ammonium acid fluoride (0.7 part) deflagrated readily with some flaming, emitting a copious deep greyish smoke which possessed a pungent odor, and formed a sublimate which contained a yellow oily material; the ruthenium fluoride smoke stained paper a dirty green color. Chloride: (196) Ruthenium mix (3.0 parts) and monochloroacetic acid (1.0 part) burned easily with some flaming, emitting an abundant light blackish or deep greyish smoke which was pungent and irritating, light tan streaks also being evident; this smoke stained paper yellow. Bromide: (197) Ruthenium mix (3.0 parts) and potassium bromide (1.0 part) deflagrated vigorously (flamed), releasing a heavy, voluminous, irritating smoke of an off-color light black, appearing rather greenish-dichroic when condensed as a sublimate. Iodide: (198) Ruthenium mix (3.0 parts) and potassium iodide (0.9 part) burned fast with flaming, giving at first a copious pale purple smoke which then turned brownish, and having a pungent odor. Mixed: (199) A mixed bromide-fluoride variety of ruthenium smoke was obtained from the flameless reaction of the admixture of ruthenium tetraminohydroxychlorochloride (0.1 part), potassium chlorate (2.0 parts), sulfur (2.0 parts), potassium bromide (0.5 part) and ammonium acid fluoride (1.0 parts); this smoke was voluminous and heavy, having a fine medium grey-green or olive color, and forming an olive-green to olive-tan sublimate, also being pungent.

*Samarium.*—As of the "rare earths."

*Scandium.*—As of the "rare earths" and thorium."

*Selenium.*—The seleniferous smokes possessed a strong radish-like odor, and exerted toxic effects upon white rats placed in an atmosphere containing the smokes. As will be evident to those skilled in the art, part or all of the sulfur employed as fuel in the present improvement can be replaced by selenium, a small increase in oxidant usually being required so that the reaction, once started (e.g., by burning magnesium ribbon), is self-sustaining. Fluoride: (200) The admixture of powdered selenium (0.35 part), potassium chlorate (1.5 parts), sulfur (1.0 part) and ammonium acid fluoride (1.0 part) burned readily, emitting a yellowish to brownish smoke. Chloride: (201) The admixture of powdered selenium (0.35 part), potassium chlorate (1.0 part), sulfur (0.5 to 1.0 part) and monochloroacetic acid (1.0 part) burned easily, evolving a heavy, voluminous red-brown smoke which turned orange. (202) When the amount of halogen donor in No. 201 was doubled the smoke took on a yellow color. (Bromide: (203) The admixture of powdered selenium (0.35 part), potassium chlorate (1.0 part) and potassium bromide (1.0 part) burned easily, emitting a heavy smoke that ranged in color from pale orangish-grey to a flesh-tan. Iodide: (204) The admixture of powdered selenium (0.35 part), potassium chlorate (1.0 to 2.0 parts), sulfur (1.0 to 2.0 parts), potassium iodide (1.0 part) and potassium iodate (1.0 part) was quick burning (some blue flaming), releasing a deep pink to lavender-orangish smoke which formed an orange-tinged sublimate.

*Silver.*—The silver iodide smokes obtained from the present improvement are adapted to seeding clouds, both from the air and from the ground, in the art of artificial rain making. Variation in the composition of the munition causes some variation in the make-up of the silver iodide smoke and sublimate, as evidenced in the following examples. Other argentiferous smokes, set out below, may exhibit cloud nucleating properties. Smokes and sublimates of mixed composition (silver with gold and tellurium) are set forth under "tellurium." Fluoride: (205) The admixture of siliver acetate (2.5 parts), potassium chlorate (4.0 parts), sulfur (2.0 parts) and ammonium acid fluoride (2.0 parts) burned vigorously, yielding a heavy slate smoke. (206) Approximately equal parts of silver nitrate, potassium chlorate, mannite and heptafluorobutyric acid gave an admixture of stiff pasty consistency; this deflagrated in a sputtering, flameless to semiflameless reaction, yielding a fine smoke which at first seemed very pale yellow but quickly acquired a pale tan-grey color, the smoke being pungent and irritating; the rate of reaction can be governed by the amounts of oxidant and halogen donor, more of the latter causing the flameless reaction. Chloride: (207) The admixture of silver acetate (2.5 parts), potassium chlorate (4.0 parts), sulfur (2.0 parts) and monochloroacetic acid (2.5 parts) burned vigorously, emitting a heavy slate colored smoke which formed a sublimate that gradually darkened in visible light. Bromide: (208) The admixture of silver stearate (3.0 parts), dextrin (2.0 parts), potassium bromide (1.0 part) and potassium bromate (1.0 part) burned at a moderate rate, evolving a greyish smoke which formed a sublimate having a slight yellowish color. (209) The admixture of silver acetate (1.0 part), potassium chlorate (4.0 parts), sulfur (2.0 parts) and potassium bromide (2.0 parts) burned vigorously with flaming, yielding a heavy slate colored smoke and seeming to have a slight lachrymating property. Iodide: (210) The admixture of silver acetate (1.5 parts), potassium chlorate (4.0 parts), sulfur (2.0 parts) and potassium iodide (3.0 parts) burned fast with flaming, emitting a heavy violet-brown smoke which formed a deep yellow, orange-spotted sublimate which also showed some dark, dirty green tints; after a period of several hours the sublimate remained yellow but carried some blackish tints. (211) The admixture of silver stearate (3.0 parts), dextrin (2.0 parts), potassium iodide (1.0 part) and potassium iodate (1.0 part) burned well, emitting a fine yellow smoke which formed a yellow sublimate. (212) The admixture of silver nitrite (1.0 part), potassium iodide (1.0 part), potassium iodate (1.5 part) and dextrin (1.0 part) burned at a moderate rate (with a crimson flame), yielding a yellow smoke which quickly turned brownish. (213) The admixture of silver acetate (0.5 part), potassium iodide (1.0 part), potassium iodate (1.0 part) and sulfur (1.0 part) burned with some difficulty, but once started emitted a yellow to yellow-green smoke which formed a sublimate of the same color. (214) The admixture of approximately equal parts of silver nitrate, potassium chlorate, mannite and iodoform, burned very fast (flaming), giving a heavy, copious smoke that was first bronze, then quickly olive-green, then green-black and finally a dense black, these color changes being especially reflected in the sublimate, which finally turned yellow.

*Strontium.*—Being an alkaline earth element, strontium behaves comparably with calicum, barium and radium in the present improvement. Strontium is another of the elements which contributes to the radioactivity of fission products. Fluoride: (215) The admixture of strontium stearate (3.0 parts), potassium chlorate (12.0 parts) and ammonium acid fluoride (4.0 parts) burned slowly, the rate increasing with more of the oxidant, but emitting a good grey smoke. Chloride: (216) The admixture of strontium stearate (3.0 parts), lithium chlorate (15.0 parts) and trichloroacetic acid (4.0 parts) burned well, giving a copious slate-grey smoke. Bromide: (217) The admixture of strontium stearate (3.0 parts), potassium chlorate (12.0 parts) and strontium bromide (5.0 parts) burned at a moderate rate (with a crimson flame), emitting a slate colored smoke. (218) The addition of potassium bromate (5.0 parts) to the formulation of No. 217 accelerated the rate of deflagration and the smoke was a fine, heavy blue-white. Iodide: (219) The admixture of strontium stearate (3.0 parts), potassium chlorate (12.0 parts), potassium iodide (2.0 parts) and potassium iodate (2.0 parts) burned vigorously, giving a heavy, voluminous pale lemon to flesh-colored smoke and some yellow sublimate.

*Tantalum.*—As of "columbium."

*Tellurium.*—The smokes of tellurium all possessed a pungent radish-like odor; the smokes are toxic in view of their composition. Fluoride: (220) The admixture of (Au,Ag)Te$_2$, otherwise known as sylvanite (1.5 parts), sodium chlorate (4.0 parts), sulfur (3.0 parts) and ammonium acid fluoride (2.5 parts) burned at a moderate rate with a bluish flame, releasing a pale blue smoke which turned light yellow. Chloride: (221) The admixture of sylvanite (1.0 part), sodium chlorate (3.0 parts), sulfur (1.5 parts) and monochloroacetic acid (1.0 part) burned well, evolving a heavy, pungent, pale yellow smoke which formed a thick sublimate, both smoke and sublimate progressively changing through a dirty pale greenish to a blackish color. Bromide: (222) The admixture of sylvanite (1.5 parts), potassium chlorate (3.0 parts), sulfur (1.5 parts) and potassium bromide (1.5 parts) burned at a good rate, emitting a voluminous bright orange-yellow smoke. (223) A bright orange-yellow smoke was liberated from the deflagration of the admixture of sylvanite (1.5 parts), potassium chlorate (3.0 parts), sulfur (1.5 parts), potassium bromate (1.0 part) and potassium bromide (1.0 part). Iodide: (224) The admixture of sylvanite (2.0 parts), potassium chlorate (4.0 parts), sulfur (3.0 parts) and potassium iodide (2.5 parts) burned well with the evolution of a heavy chocolate-black smoke. (225) A chocolate-black smoke was also liberated from the deflagration of the admixture of sylvanite (2.0 parts), potassium chlorate (4.0 parts), sulfur (3.0 parts), potassium iodide (2.0 parts) and potassium iodate (2.0 parts), some purple also being present.

*Terbium.*—As of the "rare earths."

*Thallium.*—The thallium smokes are all highly toxic and therefore adapted to industrial pesticide applications. Fluoride: (226) The admixture of thallous sulfate (1.5 parts), potassium chlorate (5.0 parts), sulfur (2.5 parts) and ammonium acid fluoride (2.0 parts) burned with the emission of a slate colored smoke which formed a slate colored sublimate. Chloride: (227) The admixture of thallous sulfate (1.5 parts), potassium chlorate (4.0 parts), sulfur (2.5 parts) and monochloroacetic acid (2.0 parts) burned with the release of a heavy, abundant grey-white smoke which formed a whitish sublimate. Bromide: (228) The admixture of thallous sulfate (1.5 parts), potassium chlorate (4.0 parts), sulfur (2.5 parts) and potassium bromide (2.0 parts) burned with the evolution of a heavy, fine pale yellow smoke which condensed to a pale yellow sublimate. Iodide: (229) That admixture of thallous sulfate (1.5 parts), potassium chlorate (4.0 parts), sulfur (2.5 parts) and potassium iodide (2.0 parts) burned with the emission of a heavy, voluminous lavender-red smoke which sublimed to a coating of deep red to red-brown, tinged with blackish-brown and deep yellowish spots.

*Thorium.*—Various thorium compounds were employed in producing smokes and sublimates of this element, including a thorium-cerium earth (containing among others La, Nd, Pr (see "rare earths"), and RaTh and MsTh) phosphate (monazite). Both the smokes and sublimates were radioactive, and gave strongly positive alizarin tests for thorium. Fluoride: (230) The admixture of monazite (2.0 parts), potassium chlorate (4.0 parts), sulfur (3.0 parts) and ammonium acid fluoride (3.0 parts) tended to flameless burning, giving a grey smoke which formed a sublimate which turned yellow in the presence of moisture. (231) Doubling the oxidant content of No. 230 caused an acceleration in the deflagration, the smoke and sublimate being similar. Chloride: (232) The admixture of monazite (2.0 parts), potassium chlorate (4.0 parts), sulfur (3.0 parts) and monochloroacetic acid (3.0 parts) burned vigorously with a bluish flame, yielding a heavy grey smoke, bordering on the grey-lavender, which formed a sublimate which turned yellow and become acrid in the presence of moisture. Bromide: (233) The admixture of monazite (3.0 parts), potassium chlorate (4.0 parts), sulfur (3.0 parts), potassium bromide (2.0 parts) and potassium bromate (2.0 parts) burned vigorously, emitting a heavy, copious slate smoke. (234) The admixture of approximately equal parts of thorium nitrate, sulfur, potassium bromide and potassium bromate (which may be up to 2 parts) burned slowly with the evolution of a grey smoke which shortly turned brown, and formed a sublimate ranging from purple to reddish; strongly radioactive. Iodide: (235) The admixture of thorium salicylate (1.0 part), potassium chlorate (1.0 part), potassium iodide (0.3 part), sulfur (0.5 part) and potassium acid sulfate (0.3 part) burned in a semiflash deflagration, giving a fine brown smoke. (236) The admixture of monazite (3.0 parts), sulfur (3.0 parts), potassium chlorate (4.0 parts), potassium iodide (2.0 parts) and potassium iodate (2.0 parts) burned with flaming, evolving a heavy, copious deep wine-red to red-brown smoke and sublimate.

*Thulium.*—As of the "rare earths."

*Tin.*—Fluoride: (237) The admixture of tin stearate (1.5 parts), potassium chlorate (5.0 parts) and ammonium acid fluoride (2.0 parts) burned moderately, emitting a greyish smoke. (238) The ingredients used in No. 237, but in ratio 2.0:6.0:3.0, respectively, gave a similar smoke. Chloride: (239) The admixture of tin stearate (2.0 parts), potassium chlorate (6.0 parts) and monochloroacetic acid (3.0 parts) burned easily with the release of a heavy, copious slate-colored smoke. Bromide: (240) The admixture of tin stearate (1.5 parts), potassium chlorate (5.0 parts) and potassium bromide (2.0 parts) burned easily with some flaming, emitting a heavy, voluminous slate colored smoke which may be yellowish tinged and forms a pale yellow sublimate. (241) The addition of potassium bromate (2.0 parts) to the admixture of No. 240 provided the same results, the smoke being less yellowish. Iodide: (242) The admixture of tin stearate (1.5 parts), potassium chlorate (5.0 parts) and potassium iodide (2.0 parts) burned well with some flaming, releasing a medium yellow smoke which condensed to a yellowish sublimate tinged with a light dirty green with some dirty green-brown. Changing the composition appears to change the nature of the smoke and sublimate, viz., (243) the admixture of tin stearate (1.5 parts), potassium chlorate (5.0 parts), potassium iodide (2.0 parts) and potassium iodate (2.0 parts) burned readily (some flaming), giving a heavy yellow to yellow-orange smoke and sublimate.

Titanium.—Fluoride: (244) The admixture of titanium stearate (3.0 parts), potassium chlorate (17.0 parts) and ammonium acid fluoride (5.0 parts) burned with the release of a grey-white smoke. Chloride: (245) The admixture of titanium stearate (3.0 parts), potassium chlorate (17.0 parts) and mono- or tri-chloroacetic acid (5.0 parts) burned with the emission of a white to grey-white smoke. Bromide: (246) The admixture of titanium stearate (3.0 parts), potassium chlorate (12.0 parts), potassium bromide (2.5 parts) and potassium bromate (2.5 parts) burned excellently, emitting a heavy, abundant white smoke. (247) Equal parts of titanium dioxide, potassium bromide, sulfur and potassium bromate gave a very quick deflagration, emitting a copious white smoke which formed a sublimate that gave a very strong Feigl test for titanium. Iodide: (248) The admixture of titanium stearate (3.0 parts), potassium chlorate (12.0 parts), potassium iodide (2.5 parts) and potassium iodate (2.5 parts) burned well with some flaming, yielding a white smoke which had a very slight lavender tinge.

Tungsten.—Fluoride: (249) The admixture of tungstic acid (1.5 parts), potassium chlorate (4.0 parts), sulfur (2.5 parts) and ammonium acid fluoride (2.0 parts) burned with some flaming, emitting a heavy, copious slate smoke. (250) The admixture of tungstic acid (3.0 parts), sodium chlorate (8.0 parts), sulfur (4.0 parts), ammonium acid fluoride (4.0 parts) and potassium acid sulfate (1.0 part) burned readily (ignited with difficulty) once started, with a tendency to flameless reaction, yielding a heavy, abundant grey smoke which lightened and formed a whitish sublimate. Chloride: (251) The admixture of tungstic acid (1.5 parts), potassium chlorate (4.0 parts), sulfur (2.0 parts) and monochloroacetic acid (2.0 parts) burned well, giving a heavy slate smoke which formed a pale slate-blue sublimate. (252) The admixture of tungstic acid (1.0 part), sodium chlorate (5.0 parts), dextrin (3.0 parts) and aluminum chlorohydroxide (4.0 parts) burned readily with a yellow flame, evolving a copious slate smoke. (253) A voluminous blue-white smoke was released upon the deflagration of phosphotungstic acid (3.0 parts), sodium chlorate (8.0 parts), sulfur (5.0 parts) and trichloroacetic acid (9.0 parts) in admixture. Bromide: (254) The admixture of tungstic acid (1.5 parts), potassium chlorate (4.0 parts), potassium bromide (1.0 part), potassium bromate (1.0 part) and dextrin (2.5 parts) burned with the emission of a slate smoke having a slight yellow and greenish tinge. Iodide: (255) The admixture of phosphotungstic acid (3.0 parts), sodium chlorate (8.0 parts), sulfur (5.0 parts) and iodic acid (4.0 parts) burned slowly (flamed), giving a heavy, copious violet smoke and a thick violet-brown sublimate. (256) The admixture of tungstic acid (2.0 parts), sodium chlorate (5.0 parts) potassium iodide (1.5 parts), potassium iodate (1.5 parts) and sulfur (3.0 parts) burned readily, emitting a dirty brownish smoke, and forming a thick violet-brown sublimate with some grey coating.

Uranium.—A variety of uranium smokes were prepared, all of which were radioactive and formed radioactive sublimates. Radioactive smokes containing uranium and radium were also made from potassium uranium vanadate (containing radium) and are set out under "vanadium." The following are representative of the batches investigated. Fluoride: (257) The admixture of uranyl acetate (3.0 parts), sodium chlorate (8.0 parts), sulfur (4.0 parts) and ammonium acid fluoride (4.5 parts) burned in a flameless reaction, emitting a grey smoke. (258) The admixture of potassium diuranate (4.0 parts), potassium chlorate (9.0 parts), dextrin (5.0 parts) and ammonium acid fluoride (4.0 parts) burned slowly with a tendency to a flameless reaction, yielding a heavy greyish smoke having a slight yellowish tinge. (259) The admixture of potassium uranyl stearate (3.0 parts), potassium chlorate (12.0 parts), sulfur (5.0 parts) and ammonium acid fluoride (6.0 parts) burned at a moderate rate, emitting a copious grey smoke having a very pale yellowish tinge, and forming a greyish sublimate which turned pale yellow in the presence of moisture. Chloride: (260) The admixture of uranyl acetate (3.0 parts), sodium chlorate (8.0 parts), sulfur (4.0 parts) and trichloroacetic acid (4.5 parts) burned moderately (flamed), emitting a heavy grey smoke. (261) The admixture of potassium diuranate (4.0 parts), potassium chlorate (9.0 parts), dextrin (5.0 parts) and monochloroacetic acid (4.0 parts) burned vigorously with much flaming, yielding a heavy, abundant grey smoke. (262) The admixture of potassium uranyl stearate (3.0 parts), potassium chlorate (12.0 parts), sulfur (5.0 parts) and monochloroacetic acid (5.0 parts) burned readily with flaming, yielding a grey smoke. (263) A voluminous grey smoke originated in the smiflash deflagration of the admixture of potassium uranyl stearate (3.0 parts), potassium chlorate (12.0 parts), dextrin (5.0 parts) and trichloroacetic acid (8.0 parts). Bromide: (264) The admixture of approximately equal parts of uranyl acetate, sulfur, potassium bromide and potassium bromate deflagrated very quickly, releasing a grey smoke which produced brown stains on wet paper. (265) The admixture of uranyl acetate (3.0 parts), sodium chlorate (9.0 parts), sulfur (5.0 parts) and potassium bromide (4.0 parts) burned at a medium rate with some flaming, giving a grey smoke. (266) The admixture of potassium diuranate (5.0 parts), potassium chlorate (9.0 parts), dextrin (5.0 parts), potassium bromide (4.0 parts) and potassium bromate (1.0 part) burned readily, evolving a heavy abundant whitish smoke which formed a whitish radioactive sublimate that turned deep greenish-black to black when moistened. (267) The admixture of potassium uranyl stearate (3.0 parts), potassium chlorate (5.0 parts), sulfur (5.0 parts), potassium bromide (5.0 parts) and potassium bromate (3.0 parts) deflagrated vigorously (flamed), yielding a dense grey-white smoke which condensed to a radioactive sublimate that turned greenish-black when moistened. (268) The admixture of potassium uranyl chloride (1.0 part), potassium chlorate (3.0 parts), sucrose (1.5 parts), potassium bromate (0.5 part) and potassium bromide (0.5 part) burned with a flame, emitting a grey smoke. (269) The admixture of potassium chlorate (1.5 parts), uranyl acetate (1.0 part), sulfur (1.0 part), potassium bromide (0.5 part), and potassium acid sulfate (0.5 part) burned moderately, giving a whitish smoke. (270) The vigorous, flaming deflagration of the admixture of uranium trioxide dihydrate (2.0 parts), potassium chlorate (10.0 parts) sulfur (5.0 parts)

and cupric bromide (4.0 parts) gives a fine, heavy deep rose to brick red radioactive smoke and sublimate containing uranium and copper; the addition of up to 4.0 to 6.0 parts of hydrobromic acid to No. 270 gives a paste which upon burning emits a dirty pale lavender smoke. Iodide: (271) The admixture of uranyl acetate (3.0 parts), potassium chlorate (8.0 parts), sulfur (5.0 parts) and potassium iodide (2.0 parts) burned with flaming, emitting a heavy lavender smoke which turned browish. (272) The admixture of potassium diuranate (5.0 parts), potassium chlorate (9.0 parts), dextrin (5.0 parts), potassium iodide (4.0 parts) and potassium iodate (1.0 part) burned moderately, yielding a fine pale tan to yellow-tan highly radioactive smoke which formed a radioactive sublimate of dark greenish-black color. (273) The admixture of potassium uranyl stearate (2.0 parts), potassium chlorate (6.0 parts), dextrin (1.0 part), potassium iodide (0.5 part) and potassium iodate (0.5 part) burned vigorously, giving a copious, dense grey smoke and radioactive sublimate which turned dark brown to blackish when wet. (274) The admixture of potassium uranyl chloride (1.0 part), potassium chlorate (3.0 parts), sucrose (1.5 parts), potassium iodate (0.5 part) and potassium iodide (0.5 part) burned (flamed), giving a lavender smoke. (275) The admixture of uranyl acetate (1.0 part), potassium chlorate (1.0 part), sulfur (0.6 part), potassium iodide (0.2 part) and potassium acid sulfate (0.2 part) burned slowly, giving a fine brown, violet tinged smoke of acrid, pungent odor.

*Vanadium.*—One series of tests involved potassium uranium vanadate containing radium (high purity carnotite), the smokes and sublimates from which were all radioactive. Mixed smokes may also be obtained from $Pb_3V_2O_8 \cdot PbCl_2$ (vanadinite). Fluoride: (276) The admixture of ammonium vanadate (2.0 parts), sodium chlorate (5.0 parts), sulfur (3.0 parts) and ammonium acid fluoride (2.0 parts) burned readily (flamed), evolving a dirty grey-violet smoke which condensed to a dirty grey-violet sublimate which carried a deep green oily material. (277) The admixture of carnotite (2.0 parts), potassium chlorate (5.0 parts), sulfur (3.0 parts) and ammonium acid fluoride (2.0 parts) burned readily with a tendency to flameless reaction, yielding a dirty off-white colored smoke. Chloride: (278) The admixture of ammonium vanadate (2.0 parts), sodium chlorate (8.0 parts), sulfur (4.0 parts) and monochloroacetic acid (4.0 parts) burned well (flamed), emitting a heavy, pungent grey smoke tinged with dirty greenish-grey. (279) The admixture of ammonium vanadate (2.0 parts), sodium chlorate (8.0 parts), sulfur (4.0 parts) and trichloroacetic acid (4.0 parts) burned readily (flamed), emitting a dense blue-white to dirty greenish-grey smoke which appeared to have a peculiar sulfur-like odor. (280) The admixture of No. 279 but in ratio 2.0:5.0:3.0:2.0, respectively, burned easily (flamed), evolving a copious grey smoke having the same peculiar odor. (281) The admixture of carnotite (2.0 parts), potassium chlorate (5.0 parts), sulfur (3.0 parts) and monochloroacetic acid (2.0 parts) produced a smoke similar to those of Nos. 279 and 280. Bromide: (282) The admixture of ammonium vanadate (2.0 parts), sodium chlorate (6.0 parts), sulfur (4.0 parts) and potassium bromide (2.0 parts) burned slowly with flaming, yielding a very pale blue-green to grey smoke. (283) The admixture of carnotite (2.0 parts), potassium chlorate (5.0 parts), sulfur (3.0 parts), potassium bromide (2.0 parts) and potassium bromate (2.0 parts) deflagrated readily, emitting a dense slate colored smoke. (284) A heavy slate colored smoke is emitted from the burning of the mixture of carnotite (2.0 parts), potassium chlorate (5.0 parts), sulfur (3.0 parts) and potassium bromide (2.0 parts). (285) Upon the addition of vanadium dichloride (1.5 to 2.0 parts) to the admixture of sodium chlorate (3.0 parts), sulfur (2.0 parts), potassium bromate (1.0 part) and potassium bromide (1.0 part) a spontaneous deflagration occurred, this emitting a smoke which was initially yellow, but which shortly changed to slate-grey, forming a slate-grey sublimate. Iodide: (286) The admixture of ammonium vanadate (2.0 parts), sodium chlorate (6.0 parts), sulfur (4.0 parts), potassium iodide (2.0 parts) and potassium iodate (2.0 parts) burned moderately (flamed), giving a dense, abundant deep violet smoke which formed a sublimate which soon turned blackish. (287) The admixture of carnotite (2.0 parts), potassium chlorate (5.0 parts), sulfur (3.0 parts) and potassium iodide (2.0 parts) burned rapidly, giving a violet smoke which formed a yellow sublimate. Mixed (288) A mixed bromide-iodide composition was prepared from carnotite (2.0 parts), potassium chlorate (5.0 parts), sulfur (5.0 parts) and potassium iodide, iodate, bromide and bromate (2.0 parts of each); this burned easily, giving a pinkish-violet smoke which formed a strongly radioactive sublimate which first appeared an oily yellow color, then turning yellow-pink in color.

*Ytterbium.*—As of the "rare earths."

*Yttrium.*—This element is also included in the investigations made upon the mixed rare earths (see "rare earths"). Fluoride: (289) The admixture of yttrium phosphate (1.0 part), potassium chlorate (3.0 parts), sulfur (1.5 parts) and ammonium acid fluoride (1.5 parts) burned readily, yielding a copious, slate-grey smoke. (290) The admixture of yttrium phosphate (1.0 part), potassium chlorate (2.3 parts), sulfur (1.5 parts) and sodium silicofluoride (1.0 part) was good burning (flamed), giving an abundant slate-grey smoke. Chloride: (291) The admixture of yttrium phosphate (1.0 part), potassium chlorate (3.0 parts), sulfur (1.5 parts) and monochloroacetic acid (1.0 part) burned well (flamed), emitting a heavy, voluminous blue-grey smoke which condensed to a sublimate of the same color. Bromide: (292) The admixture of yttrium phosphate (1.0 part), potassium chlorate (2.0 parts), sulfur (1.5 parts), potassium bromide (1.0 part) and potassium bromate (1.0 part) burned readily (flamed), evolving a fine copious white smoke which formed a very slightly yellow-tinged white sublimate. Iodide: (293) The admixture of yttrium phosphate (1.2 parts), potassium chlorate (2.5 parts), sulfur (1.5 parts), potassium iodide (1.0 part) and potassium iodate (1.0 part) burned easily (flamed), giving a heavy lavender smoke which soon turned brown. Mixed: (294) A mixed bromide-chloride yttrium smoke was produced from the deflagration of the mixture of yttrium phosphate (1.0 part), potassium chlorate (2.0 parts), sulfur (1.0 part), monochloroacetic acid (1.0 part) and potassium bromide (1.0 part); this admixture burned readily, giving a grey colored smoke.

*Zinc.*—Fluoride: (295) The admixture of zinc palmitate (3.0 parts), potassium chlorate (9.0 parts) and ammonium acid fluoride (2.0 parts) burned moderately (flamed), emitting a white smoke. Chloride: (296) The admixture of zinc palmitate (3.0 parts), potassium chlorate (9.0 parts) and monochloroacetic acid (4.0 parts) burned at a medium rate with flaming, giving a white smoke and white sublimate. Bromide: (297) The admixture of zinc palmitate (3.0 parts), potassium chlorate (9.0 parts), potassium bromide (1.0 part) and potassium bromate (1.0 part) deflagrated vigorously (with flaming), yielding a dense white smoke and white sublimate. (298) The admixture of approximately equal parts of powdered zinc metal, sulfur, potassium bromide and potassium bromate deflagrated quickly with a high blue flame, emitting a white-grey smoke. Iodide: (299) The admixture of zinc palmitate (3.0 parts), potassium chlorate (9.0 parts), potassium iodide (1.0 part) and potassium iodate (1.0 part) burned readily, emitting a fine dense and abundant pale to medium yellow colored smoke. (300) The admixture of approximately equal parts of powdered zinc, potassium iodide, potassium iodate and sulfur burned well, yielding a heavy yellow colored smoke. (301) The admixture of zinc acetate (1.0 part), potassium chlorate (1.0 part), sulfur (0.5 part), potassium iodide (0.25 part) and potassium acid sulfate (0.25 part) burned slowly, giving a grey smoke having a very slight brownish tinge, also being of a peculiar odor.

*Zirconium.*—This element accounts for a part of the radioactivity of fission products. Fluoride: (302) The admixture of zirconyl sulfate (2.0 parts), potassium chlorate (6.0 parts), sulfur (3.5 parts) and ammonium acid fluoride (2.0 parts) deflagrated at a moderate rate, giving a grey smoke. Chloride: (303) The admixture of zirconyl sulfate (2.0 parts), potassium chlorate (5.0 parts), sulfur (3.0 parts) and monochloroacetic acid (2.0 parts) burned quickly with flaming, emitting a grey smoke. Bromide: (304) The admixture of zirconyl sulfate (2.0 parts), sodium chlorate (5.0 parts), sulfur (3.0 parts), potassium bromide (2.0 parts) and potassium bromate (2.0 parts) burned readily, emitting a dirty slate-grey colored smoke. (305) A grey smoke was emitted from the slow burning mixture of zirconyl sulfate (2.0 parts), sodium chlorate (5.0 parts), sulfur (3.0 parts) and potassium bromide (2.0 parts). Iodide: (306) The admixture of zirconyl sulfate (2.0 parts), sodium chlorate (6.0 parts), sulfur (4.0 parts), potassium iodide (2.5 parts) and potassium iodate (2.5 parts) burned easily (flamed), yielding a fine peach-brown smoke which condensed to a deep brown sublimate tinged with yellow. (307) A deep purple smoke and sublimate are produced from the deflagration of the slow burning admixture containing zirconyl sulfate (2.0 parts), sodium chlorate (6.0 parts), sulfur (4.0 parts) and potassium iodide (3.5 parts).

*Carbon.*—Along with boron and silicon, carbon resembles the quadrivalent metals in halogenic smoke formation. The chemical properties of carbon are known to be like the quadrivalent metals in halide compound formation (also in particular like germanium (which see)). Carbon, and evidently certain other elements set out herein (e.g., silicon, following), appears unique in that the nature of the carbon donor seems in some instances to relate to significant variations within the class of carbon smokes. At least two variations are indicated: When the carbon donor is carbon black or an organic material, one general type of halogenic smoke is produced; but when the donor is graphite or a lamellar carbon compound, another general type of halogenic smoke appears to form: For example, respectively, carbon fluoride (or carbon bromide), and, graphite fluoride (or graphite bromide). Physically and chemically the graphite-halide smokes appear distinct from the first-mentioned carbon-halide smokes, despite the fact that in an elemental sense the same donor is involved in each. Therefore, the term "carbon" is to be taken in its broadest meaning, as is true the other elements listed herein. Also it follows that the carbon-halide smokes may be accessory to other halogenic smokes when carbon is a reactant in the admixture, as when in excess of the fuel needs of a particular composition. Fluoride: (308) The admixture of carbon black (5.0 parts), potassium chlorate (20.0 parts) and ammonium acid fluoride (7.5 parts) deflagrated vigorously (flamed), evolving a large volume of dense grey smoke, forming a thick, grey sublimate. (309) Heptafluorobutyric acid (3 to 5 parts) added to No. 308 reduced the reaction rate, but apparently did not greatly lessen the amount and quality of carbon fluoride smoke. (310) The admixture of graphite (5.0 parts), potassium permanganate (5.0 parts), magnesium (2.0 parts), potassium chlorate (7.5 parts) and ammonium acid fluoride (5.0 parts) burned in a two-stage reaction, the first resembling No. 309, the second involving the magnesium with the emission of more heat and the same heavy, grey smoke. (311) The admixture of graphite (3.0 parts), sulfur (3.0 parts), potassium chlorate (12.0 parts), ammonium acid sulfate (4.0 parts) and ammonium acid fluoride (2.0 parts) burned in a semiflameless reaction, giving a grey-white smoke and sublimate. (312) The admixture of graphite (1.0 part), carbon black (1.0 part), potassium chlorate (10.0 parts) and ammonium acid fluoride (2.5 parts) burned slowly (nearly semiflameless), emitting a grey smoke which formed a grey sublimate. (313) The admixture of boron carbide (2.0 parts), potassium permanganate (4.0 parts), magnesium (1.0 part), potassium chlorate (5.0 parts) and ammonium acid fluoride (3.0 parts) burned hotly with flaming, giving a copious grey smoke and sublimate. Chloride: (314) The admixture of carbon black (3.5 parts), potassium chlorate (20.0 parts) and monochloroacetic acid (8.0 parts) burned readily, emitting a large volume of grey-white smoke having a pungent, semiaromatic odor. (315) The admixture of carbon black (3.5 parts), potassium chlorate (20.0 parts), monochloroacetic acid (8.0 parts) and cuprous chloride (6.0 parts) resembled No. 314, giving a fine dense green-tan smoke which faded quickly, forming a light-greyish-tan sublimate. (316) A dense, copious grey smoke was emitted from the deflagration of the admixture of carbon black (3.5 parts), potassium chlorate (20.0 parts), monochloroacetic acid (8.0 parts) and aluminum chlorohydroxide (8.0 parts). (317) The admixture of graphite (4.0 parts), potassium chlorate (20.0 parts) and monochloroacetic acid (6.0 parts) deflagrated slowly (flamed), emitting a white smoke which quickly changed to light brown, acrid and dense. (318) The admixture of graphite (4.0 parts), potassium chlorate (20.0 parts), monochloroacetic acid (6.0 parts) and sulfur (2.0 parts) burned at a moderate rate, evolving incandescent, reacting particles along with a copious, acrid white smoke and sublimate. (319) A mixed boron-carbon smoke was emitted in the slow, flameless burning of boron carbide (2.0 parts), potassium permanagate (4.0 parts), potassium chlorate (8.0 parts), monochloroacetic acid (4.0 parts) and aluminum chlorohydroxide (1.0 part); this smoke gave a strong green boron flame test, was grey-white and formed a sublimate of the same color. (320) A similar smoke, having a very slight greenish tinge, was evolved in the deflagration of the admixture of boron carbide (2.0 parts), potassium permanganate (4.0 parts), potassium chlorate (8.0 parts), monochloroacetic acid (4.0 parts) and cuprous chloride (1.0 part). Bromide: (321) The admixture of carbon black (4.0 parts), potassium chlorate (20.0 parts), ammonium bromide (8.0 parts) and potassium bromate (4.0 parts) burned (flamed) with the emission of a dense, voluminous grey smoke and thick grey sublimate, the smoke having a peculiar, aromatic bromine-like odor. (322) The admixture of carbon black (4.0 parts), potassium chlorate (20.0 parts), potassium bromide (8.0 parts) and monochloroacetic acid (4.0 parts) resembled No. 321. (323) The admixture of carbon black (4.0 parts), potassium chlorate (20.0 parts), potassium bromide (8.0 parts) and ammonium acid fluoride (8.0 parts) burned slowly, emitting a good grey-white, acrid smoke and sublimate. (324) The admixture of graphite (3.0 parts), potassium chlorate (15.0 parts) and ammonium bromide (3.5 parts) deflagrated in a slow, semiflameless reaction, evolving a copious tannish-white smoke. (325) The admixture of graphite (3.0 parts), potassium chlorate (15.0 parts), ammonium bromide (3.5 parts) and sulfur (2.0 parts) deflagrated at a moderate rate, with incandescent "sparks" accompanying the white (perhaps slight greenish) smoke. (326) The admixture of graphite (3.0 parts), potassium chlorate (15.0 parts), bromoform (6.0 parts) and sulfur (2.0 parts) burned readily (flamed), emitting incandescent "sparks" along with a copious orange-tan smoke. (327) The admixture of boron carbide (2.0 parts), potassium permanganate (4.0 parts), potassium chlorate (14.0 parts), monochloroacetic acid (4.0 parts) and strontium bromide (4.0 parts) burned in a semiflameless reaction, emitting a whitish smoke. (328) The admixture of boron carbide (2.0 parts), potassium permanganate (4.0 parts), sulfur (4.0 parts), potassium chlorate (14.0 parts), potassium bromate (2.0 parts) and ammonium bromide (2.0 parts) deflagrated in a brilliant semiflash reaction, evolving a dense, abundant light grey smoke and sublimate; about 60% appeared to escape as smoke. Iodide: (329) The admixture of carbon black (4.0 parts), potassium permanganate (8.0 parts), potassium chlorate (20.0 parts) and iodoform (6.0 parts) burned in a flaming reaction, giving a very copious dark red-brown smoke and sublimate of the same color; about 70% of this mix appeared to escape as smoke. (330) A carbon iodide smoke of apparently different composition was formed in the deflagration (flaming) of the admixture of carbon black (4.0 parts), potassium permanganate (8.0 parts), potassium chlorate (20.0 parts), potassium iodate (4.0 parts) and potassium iodide (2.0 parts), giving a heavy, voluminous cream-white smoke and sublimate; about 52% appeared to escape as smoke. (331) The admixture of graphite (4.0 parts), potassium permanganate (4.0 parts), potassium chlorate (10.0 parts), iodoform (6.0 parts) and sulfur (2.0 parts), deflagrated quickly, emitting a heavy, copious, brick-red-orange smoke having a very strong cinnamon-like odor, forming at first a black-bronze sublimate which turned chocolate-red. (332) The admixture of graphite (4.5 parts), potassium permanganate (4.0 parts), potassium chlorate (10.0 parts), potassium iodide (3.0 parts) and sulfur (2.0 parts) burned quickly (flamed), with incandescent "sparks," concurrently giving a dirty orchid, then brown, copious and dense smoke of acrid odor, becoming a chocolate-red color and in several hours ending as light brown, the sublimate being the same. (333) The admixture of boron carbide (2.0 parts), potassium permanganate (4.0 parts), potassium chlorate (10.0 parts), sulfur (3.0 parts), potassium iodide (3.0 parts) and potassium iodate (1.5 parts) deflagrated in a brilliant semiflash reaction, evolving an orange-brown smoke and sublimate; about 67% of this mix appeared to escape as smoke.

*Boron.*—For mixed boron-carbon halogenic smokes see "carbon." Also, compare with "silicon," following. Fluoride: (334) The admixture of boron trioxide (4.0 parts), potassium chlorate (12.0 parts), sulfur (2.0 parts) and ammonium acid fluoride (3.0 parts) deflagrated in a semiflameless reaction, evolving a white smoke which gave the typical green boron flame test; about 61% of this mix appeared to escape as smoke. (335) The admixture of potassium chlorate (12.0 parts), sulfur (3.0 parts), butyl borate (3.0 parts) and ammonium acid fluoride (1.5 parts) burned vigorously with a green flame, emitting a heavy, dense white smoke and white sublimate; the smoke had a very pungent, acrid odor, and caused paper to turn rose colored; about 70% appeared to escape as smoke. Chloride: (336) The admixture of potassium chlorate (12.0 parts), sulfur (3.0 parts), butyl borate (3.0 parts) and monochloroacetic acid (3.0 parts) burned well (green flaming), emitting a dense, acrid white smoke and sublimate; about 81% appeared to escape as smoke. (337) With ethyl borate (3.0 parts) instead of the butyl borate in No. 336 the same smoke and sublimate were produced, but only 74% appeared to escape as smoke. Bromide: (338) The admixture of potassium chlorate (12.0 parts), sulfur (3.0 parts), strontium bromide (3.0 parts) and butyl borate (3.0 parts) burned with much flaming, giving a white smoke and sublimate. (339) The admixture of potassium chlorate (12.0 parts), sulfur (3.0 parts), bromoform (4.0 parts) and butyl borate (4.0 parts) deflagrated vigorously with flaming, emitting a heavy, voluminous grey-white boroniferous smoke having a pungent odor; about 80% appeared to escape as smoke. Iodide: (340) The admixture of potassium chlorate (12.0 parts), iodoform (3.0 parts) and butyl borate (3.0 parts) burned readily with flaming, yielding a dirty rose colored and dense smoke and sublimate; about 71% appeared to escape as smoke. (341) The admixture of potassium chlorate (10.0 parts), boron trioxide (2.5 parts), potassium iodate (4.5 parts), potassium iodide (1.5 parts) and sulfur (4.0 parts) burned (flamed) with the evolution of a deep, dirty grey-lavender smoke and sublimate, the latter turning dirty brown with some orange; about 54% appeared to escape as smoke. (342) The admixture of potassium permanganate (8.0 parts), potassium chlorate (3.0 parts), sulfur (3.0 parts), boric acid (3.0 parts) and cuprous bromide (3.0 parts) burned in a semiflameless reaction, evolving a dense, off-white (slight rose tinged) smoke having a pungent odor.

*Silicon.*—Like carbon and boron, silicon appears to resemble the quadrivalent metals in its ability to form halogenic smokes. Also, like boron and carbon, though in some respects much more so, silicon forms a great number of halides, the chemistries of which are variegated and complex; in the present improvement this is amply illustrated by the following examples. Both radioactive silicon halide smokes and smokes of mixed composition were made. Fluoride: (343) The admixture of potassium chlorate (12.0 parts), sulfur (4.0 parts), ammonium acid fluoride (2.0 parts) and radioactive silica (2.0 parts) deflagrated at a moderate rate (flamed), emitting a very pungent, acrid white radioactive smoke which formed a white radioactive sublimate. (344) The admixture of potassium chlorate (12.0 parts), sulfur (3.0 parts), heptafluorobutyric acid (4.0 parts) and radioactive silica (3.0 parts) burned readily with some flaming, evolving a very acrid, corrosive, white (yellowish-tinged) radioactive smoke which formed a white sublimate. These smokes etch glass and attack organic matter. (345) The admixture of potassium chlorate (12.0 parts), sulfur (3.0 parts), ammonium acid fluoride (3.0 parts) and ethyl silicate (4.0 parts) burned with the evolution of a beautiful, abundant, heavy white smoke which formed a fluffy snow-like sublimate, the smoke having a peculiar sulfhydryl-like odor; about 72% appeared to escape as smoke. (346) The admixture of potassium chlorate (12.0 parts), sulfur (3.0 parts), ammonium acid fluoride (3.0 parts), ethyl silicate (3.0 parts) and butyl borate (3.0 parts) burned readily, emitting a copious cream-white smoke which formed a thick fluffy whitish (yellowish tinged) sublimate. (347) The admixture of potassium chlorate (12.0 parts), sulfur (3.0 parts), crystalline silicon (3.0 parts) and heptafluorobutyric acid (4.0 parts) deflagrated easily (flamed, emitting incandescent particles), releasing a white smoke and sublimate having an extremely acrid odor; about 70% appeared to escape as smoke. (348) The admixture of potassium chlorate (12.0 parts), sulfur (3.0 parts), pentafluoropropionic acid (3.0 parts) and 3.0 parts of calcium silicon alloy (28–35% Ca:60–65% Si) burned vigorously with flaming and incandescent "sparks," evolving a foul-smelling grey-white smoke which formed a tan-grey sublimate. (349) The admixture of potassium chlorate (10.0 parts), sulfur (3.0 parts), ammonium acid fluoride (3.0 parts) and amyltriethoxysilane (3.0 parts) burned slowly (flamed), giving a copious white smoke having a strong garlic-like odor and forming a sublimate which, like the smoke, may turn brown. Chloride: (350) The admixture of potassium chlorate (12.0 parts), sulfur (2.0 parts), monochloracetic acid (4.0 parts) and radioactive silica (3.0 parts) burned vigorously (flamed), giving a whitish smoke which formed a cream-colored sublimate. (351) The admixture of potassium chlorate (12.0 parts), sulfur (2.0 parts), cuprous chloride (3.0 parts) and radioactive silica (3.0 parts) burned vigorously with flaming, evolving a pale tan-white smoke which faded to white, the sublimate becoming bright yellow when moistened. (352) The admixture of potassium chlorate (12.0 parts), sulfur (3.0 parts), monochloroacetic acid (4.0 parts) and ethyl silicate (5.0 parts) burned well (flamed), yielding a copious white smoke and sublimate; about 83% appeared to escape as smoke. (353) The admixture of potassium chlorate (12.0 parts), sulfur (3.0 parts), cuprous chloride (4.0 parts) and ethyl silicate (5.0 parts) deflagrated in a semiflash reaction, giving a pale green-tan tinged white smoke and sublimate. (354) The admixture of potassium chlorate (12.0 parts), sulfur (2.0 parts), monochloroacetic acid (3.0 parts) and crystalline silicon (3.0 parts) burned vigorously, emitting a fine white smoke and sublimate. (355) The admixture of potassium chlorate (12.0 parts), sulfur (3.0 parts), monochloroacetic acid (3.0 parts) and calcium silicon alloy (3.0 parts) burned quickly, giving a heavy grey smoke and sublimate. (356) The admixture of potassium chlorate (12.0 parts), sulfur (2.0 parts), monochloroacetic acid (3.0 parts) and ethyltriethoxysilane (3.0 parts) burned vigorously (much flaming), giving a white smoke and sublimate. Bromide: (357) The admixture of potassium chlorate (15.0 parts), sulfur (3.0 parts), bromoform (6.0 parts) and radioactive silica (3.0 parts) burned quickly (flamed), evolving a fine light brown radioactive smoke which fumed in moist air and gave a thick tan radioactive sublimate which turned brown-black in water, had a pH of 4.5–5.0; about 62% appeared to escape as smoke. (358) The admixture of potassium chlorate (12.0 parts), sulfur (3.0 parts), bromoform (4.0 parts) and ethyl silicate (4.0 parts) burned readily, giving a dirty, heavy yellow smoke and sublimate, also some greyish colors. (359) The admixture of potassium chlorate (12.0 parts), sulfur (3.0 parts), ammonium bromide (3.0 parts) and crystalline silicon (3.0 parts) gave a copious white smoke and sublimate of wine-red and yellow colors, both fading to white, strongly lachrymating. (360) The admixture of potassium chlorate (10.0 parts), sulfur (2.0 parts), potassium bromide (2.0 parts) and calcium silicon alloy (2.0 parts) burned with flaming and incandescent "sparks," yielding a heavy white smoke having a slight tan tinge. (361) The admixture of potassium chlorate (12.0 parts), sulfur (3.0 parts), ammonium bromide (3.0 parts) and amyltriethoxysilane (3.0 parts) deflagrated in a semi-flash reaction (much flaming), emitting a white smoke having a strong spicy odor; about 70% appeared to escape as smoke. Iodide: (362) The admixture of potassium chlorate (12.0 parts), sulfur (4.0 parts), iodoform (4.0 parts) and radioactive silica (4.0 parts) burned easily (flamed), giving a nice violet radioactive smoke which formed a metallic grey-violet radioactive sublimate which turned brown, after about one day becoming yellow and white, the smoke lachrymating. (363) The admixture of potassium chlorate (15.0 parts), sulfur (3.0 parts), iodic acid (3.0 parts) and radioactive silica (3.0 parts) burned vigorously (flamed), giving a heavy, copious radioactive smoke that was first orchid and then became wine-red, forming a wine-colored radioactive sublimate; the moist sublimate had a pH of 5.0–6.5. (364) The admixture of potassium chlorate (12.0 parts), sulfur (3.0 parts), iodoform (4.0 parts) and ethyl silicate (4.0 parts) burned well, giving a copious, dense orange-red smoke and sublimate, with some tan. (365) Replacing the iodoform of No. 364 with iodic acid gave a yellower smoke; about 85% appeared to escape during the burning. (366) The admixture of potassium chlorate (12.0 parts), sulfur (3.0 parts), ammonium iodide (3.0 parts) and crystalline silicon (3.0 parts) burned vigorously with flaming, giving a vari-colored smoke (violet, then whitish, then brick-red and finally orchid) and forming an orchid to orchid-tan sublimate. (367) The admixture of potassium chlorate (10.0 parts), sulfur (2.0 parts), iodoform (3.0 parts) and calcium silicon alloy (3.0 parts) burned quickly (flamed), emitting incandescent particles along with a fine orchid smoke which formed a black sublimate, the smoke having an acrid, cinnamon-like odor. (368) The admixture of potassium chlorate (10.0 parts), sulfur (3.0 parts), potassium iodide (2.5 parts) and calcium silicon alloy (2.0 parts) burned vigorously (flamed), yielding a medium orange smoke having a cinnamon-like odor, forming a red-brown sublimate. (369) The admixture of potassium chlorate (5.0 parts), mannite (1.0 part), ammonium iodide (1.0 part) and calcium silicon alloy (1.0 part) burned slowly (flamed), evolving an orange smoke which turned dirty violet, then orchid. (370) The admixture of potassium chlorate (12.0 parts), sulfur (3.0 parts), ammonium iodide (3.0 parts) and amyltriethoxysilane (3.0 parts) burned vigorously (flamed), giving a heavy orange smoke and sublimate, also a strong cinnamon-like odor.

*Alkali Metals.*—In view of the fact that the alkali metals are comparable to "ammonium" (which see) and to monovalent light metals in many respects, a detailing of examples of halogenic smokes which include these elements is not deemed necessary herein: Also, in view of the fact that the several hundred examples of halogenic smoke-producing compositions have very often involved an alkali element compound as one or more of the otherwise four basic reactive components (single or mixed). The alkali elements are to be included because their presence in many of the other halogenic smokes set out herein was amply and readily proven by flame tests, visual spectroscopy of smoke and sublimate samples, and by like analytic methods. Hence the fact that the alkali metals are properly included. (Compare the following considerations on halogenic smoke make-up.)

The smokes produced by the methods and compositions disclosed herein appear to vary widely in composition; as will be evident to those skilled in the art, this variance depends upon product stability (smoke and/or sublimate), the reaction temperature, the nature and proportions of the reacting components, and like factors. Nevertheless, it is emphasized that all of the halogenic smokes, as well as the compositions which yield them, do have the common characteristic of comprising a halogen(s) in combination with another distinctive element(s), the latter being halogen-reactive, and both the halogen and distinctive element being available to one another for union under the conditions of the reaction which, again depending upon the particular case, may or may not involve other elements. Hence, the reduction of the present improvement to terms of four basic classes of reactive components (A, B, C and D, described in detail previously) has been both expedient and necessary. These classes are not believed so dissimilar or non-related chemically or physically as to be repugnant to accepted principles of scientific classification. The reduction to four basic classes enables the artisan to select before use any particular combination that may be desired (e.g., desired in terms of smoke and/or sublimate composition, properties and/or application).

Compositionally, the new halogenic smokes and their sublimates probably include upwards of a dozen chemical varieties. A given halogenic smoke may be made up of several of these chemical varieties or largely of a single variety, according to the case, as for example in the following:

(i) High-stability adsorption complexes;
(ii) Well-defined, simple halides;
(iii) Well-defined halides of mixed valencies;
(iv) Autocomplex halides such as $(RX_3)_2R$ and $(RX_4)R$, where R is a metal or cation and X is a halogen;
(v) Double halides such as $(RX_3)A$, $(RX_4)A_2$ and $(RX_4)A$, where A is an alkali metal;
(vi) Polyhalides and haloidal polymers such as $RXX'_4$ and $RX'(XX'_3)$;
(vii) High-stability oxyhalides such as $ROX$, $ROX_2$, $ROX_3$, $RO_2X_2$, $ROX_4$, $R_2O_3X_5$; also, perhaps in some few instances high-stability halohydroxides such as $R_3X_4(OH)_2$;
(viii) Subhalides in some few instances such as $R_nX_{n-1}$ and $R_nX_{n-m}$, where R is for example a divalent metal ($n=2$), and $m$ is less than $n$;
(ix) In some instances halides which carry bound water in a highly stable combination.

It is noted that the above-given list excepts the secondary and minor cases where oxides and certain fuel-derived components (e.g., sulfides in particular (see also "carbon")) and, in perhaps a very few instances, certain oxidant-derived components (e.g., where the oxidant is a chlorine-bearing compound (e.g., chlorate), but the bonding energies involved in the halogenic smoke are greater than the bonding energies involved in the cation after the breakdown of the oxidant). These may be formed concurrently with any or several of the above-listed types of products, especially the metalloidal and the non-metallic elements, and escape as smoke from the reacting mass.

Also excepted from the above-list are the known and/or deliberately added reactants which are sublimable or volatile, which may escape (particularly when present in excessive quantities) because of the heat of reaction, which modification of the present improvement has been discussed previously.

In addition, I believe that the smokes and sublimates given by certain of my formulations comprise presently unknown halogen compounds.

Although I have described my invention in detail and have specified numerous particular examples and various modifications, and have proposed various explanations, it is to be understood that these are not binding nor exhaustive but are intended rather for the assistance of others skilled in the art to enable them more easily to apply my invention under widely varying conditions encountered or desired in actual practice and to change and modify the particular embodiments and examples herein set out as may be necessary or desirable under such varying conditions. The theoretical statements are, of course, not conclusive and my invention is in no way dependent upon their correctness. I have found them helpful and have based them wherever and whenever possible upon the best knowledge of chemistry (which knowledge I have rather extensively searched out in the literature) and give them for the aid of others, but my invention will be equally useful if it should prove that these explanations and conclusions are not altogether correct.

I claim:

1. A new composition of matter for the production of a metal haloid smoke which consists of the admixture of approximately 1 to 5 parts-by-weight of a fuel-supplying fatty acid soap of a haloid smoke-forming metal selected from the class consisting of Ba, Cd, Ca, Cr, Co, Cu, Fe, Pb, Mg, Mn, Ni, the rare earth elements, Sr, Sn, Ti and Zn and mixtures thereof, approximately 4 to 15 parts-by-weight of a fuel oxidant and halogen-supplying material selected from the group consisting of sodium, potassium and ammonium chlorates, iodates and bromates, and approximately 2 to 8 parts-by-weight of a halogen compound for providing a supplemental supply of halogen to react with the metal of said soap, said compound characterized by the formula selected from the class consisting of $RX_n$, $RX_n \cdot HX$ and $RX_n \cdot HX'$, wherein R is a material selected from the class consisting of $NH_4+$, alkali metals and alkaline earth metals, $n$ is an integer not greater than 2, X is a halogen, and X' is a halogen unlike X, whereby upon deflagration the admixture evolves said haloid smoke.

2. A new composition for the production of a metal haloid smoke which consists of the admixture of approximately 1 to 5 parts-by-weight of a fuel-supplying fatty acid soap of a haloid smoke-forming metal selected from the group consisting of Ba, Cd, Ca, Cr, Co, Cu, Fe, Pb, Mg, Mn, Ni, the rare earth elements, Sr, Sn, Ti, Zn and mixtures thereof, approximately 4 to 15 parts-by-weight of a fuel oxidant and halogen-supplying material selected from the group consisting of ammonium chlorate, ammonium iodate, ammonium bromate, sodium chlorate, sodium iodate, sodium bromate, potassium chlorate, potassium iodate, and potassium bromate, and approximately 2 to 8 parts-by-weight of a halogen compound for providing a supplemental supply of halogen to react with the metal of said soap, said compound characterized by the formula selected from the class consisting of $RX_n$, $RX_n \cdot HX$ and $RX_n \cdot HX'$, wherein R is a material selected from the class consisting of $NH_4+$, alkali metals, and alkaline earth metals, $n$ is an integer not greater than 2, X is a halide selected from the class consisting of fluorine, iodine, and bromine, and X' is a halogen unlike X, whereby upon deflagration the admixture evolves said haloid smoke.

3. A new composition of matter for the production of a metal haloid smoke which consists of the admixture of approximately 1 to 5 parts-by-weight of a fuel-supplying metallic soap of a haloid smoke-forming metal, approximately 4 to 15 parts-by-weight of a fuel oxidant and halogen-supplying material selected from the group consisting of ammonium chlorate, ammonium bromate, ammonium iodate, sodium chlorate, sodium bromate, sodium iodate, potassium chlorate, potassium bromate potassium iodate, and approximately 2 to 8 parts-by-weight of a halogen compound for providing a supplemental supply of halogen to react with the metal of said soap, said compound characterized by the formula selected from the class consisting of $RX_n$, $RX_n \cdot HX$ and $RX_n \cdot HX'$, wherein R is a material selected from the class consisting of $NH_4+$, alkali metals, and alkaline earth metals, $n$ is an integer not greater than 2, X is a halogen, and X' is a halogen unlike X, whereby upon deflagration the admixture evolves said haloid smoke.

References Cited in the file of this patent

UNITED STATES PATENTS

| | | |
|---|---|---|
| 1,339,142 | Weisgerber | May 4, 1920 |
| 1,339,146 | Weisgerber | May 4, 1920 |
| 1,433,732 | Lewis et al. | Oct. 31, 1922 |
| 1,448,073 | Lucas et al. | Mar. 13, 1923 |
| 1,461,646 | French et al. | July 10, 1923 |
| 2,396,710 | Levey et al. | Mar. 19, 1946 |

OTHER REFERENCES

Clouds and Smokes, Gibbs, Blakiston's Son and Co., Phila., 1924, pages 225–232.

Chemical Formulary, Bennett, Van Nostrand Co., N.Y., vol. 1 (1933), pages 171 and 172.